United States Patent
Irie et al.

(10) Patent No.: US 12,486,838 B2
(45) Date of Patent: Dec. 2, 2025

(54) PUMP CONTROL DEVICE AND PUMP CONTROL SYSTEM

(71) Applicant: MINEBEA MITSUMI INC., Nagano (JP)

(72) Inventors: Takahiko Irie, Tokyo (JP); Shigenori Inamoto, Tokyo (JP); Yuki Takahashi, Tokyo (JP); Chikara Sekiguchi, Tokyo (JP); Yuta Yoshii, Tokyo (JP)

(73) Assignee: MINEBEA MITSUMI INC., Nagano (JP)

( * ) Notice: Subject to any disclaimer, the term of this patent is extended or adjusted under 35 U.S.C. 154(b) by 142 days.

(21) Appl. No.: 17/907,528

(22) PCT Filed: Mar. 24, 2021

(86) PCT No.: PCT/JP2021/012111
§ 371 (c)(1),
(2) Date: Sep. 27, 2022

(87) PCT Pub. No.: WO2021/200423
PCT Pub. Date: Oct. 7, 2021

(65) Prior Publication Data
US 2023/0147348 A1 May 11, 2023

(30) Foreign Application Priority Data

Mar. 31, 2020 (JP) .................................. 2020-064576

(51) Int. Cl.
*F04B 45/047* (2006.01)
(52) U.S. Cl.
CPC .................................. *F04B 45/047* (2013.01)
(58) Field of Classification Search
None
See application file for complete search history.

(56) References Cited

U.S. PATENT DOCUMENTS

| 6,379,310 B1* | 4/2002 | Mori | A61B 5/0225 600/490 |
| 2002/0164255 A1* | 11/2002 | Burr | F04B 35/045 417/413.1 |
| 2004/0146417 A1* | 7/2004 | Dunn | F04B 49/065 417/417 |
| 2005/0222526 A1* | 10/2005 | Perry | A61H 9/0007 601/150 |

(Continued)

FOREIGN PATENT DOCUMENTS

| CN | 108071581 A | 5/2018 |
| EP | 2607669 A1 | 6/2013 |

(Continued)

OTHER PUBLICATIONS

Machine Translation of JP2013220321 Kobayashi (Obtained from https://worldwide.espacenet.com/ Nov. 2024) (Year: 2024).*

(Continued)

*Primary Examiner* — Dominick L Plakkoottam
*Assistant Examiner* — Geoffrey S Lee
(74) *Attorney, Agent, or Firm* — McCoy Russell LLP

(57) ABSTRACT

A pump control device controls a pump including a vibration actuator for vibrating a vibrating body due to electromagnetic drive caused by electrical current supply to coils, a sealed chamber which includes a movable wall which can be displaced by vibration of the vibrating body so that fluid can be suctioned into an inside of the sealed chamber or discharged from the inside of the sealed chamber, and a discharge portion for communicating the fluid between the sealed chamber and a tank to increase pressure of the fluid. The pump control device contains an obtaining part for obtaining pressure value information, and a control unit for controlling a drive frequency of an electrical current to be supplied to the coils based on the obtained pressure value information.

6 Claims, 18 Drawing Sheets

(56) References Cited

U.S. PATENT DOCUMENTS

| | | | | |
|---|---|---|---|---|
| 2006/0025693 A1* | 2/2006 | Sano | ...................... | A61B 5/022 600/490 |
| 2010/0268098 A1* | 10/2010 | Ito | .......................... | A61B 5/022 600/490 |
| 2014/0207009 A1* | 7/2014 | Sawanoi | ............ | A61B 5/02225 600/494 |
| 2014/0257116 A1 | 9/2014 | Kobayashi et al. | | |
| 2018/0051690 A1* | 2/2018 | Stair | ....................... | F04B 25/02 |
| 2020/0121258 A1* | 4/2020 | Zhu | .................... | A61B 5/02125 |
| 2020/0323442 A1* | 10/2020 | Hamaguchi | .......... | G04G 21/025 |
| 2021/0307631 A1* | 10/2021 | Ono | ..................... | A61B 5/6844 |
| 2022/0213887 A1* | 7/2022 | Yoshii | .................. | F04B 17/042 |
| 2023/0147348 A1* | 5/2023 | Irie | ......................... | F04B 45/04 417/413.1 |

FOREIGN PATENT DOCUMENTS

| | | | | |
|---|---|---|---|---|
| JP | H0216379 | A | 1/1990 | |
| JP | H0663879 | U | 9/1994 | |
| JP | 4396095 | B2 | 1/2010 | |
| JP | 2012135174 | A | 7/2012 | |
| JP | 2013220321 | A * | 10/2013 | ........... A61B 5/0225 |
| JP | 2019075966 | A | 5/2019 | |
| JP | 2020006344 | A | 1/2020 | |
| WO | WO-2013108459 | A1 * | 7/2013 | ......... A61B 5/02233 |
| WO | 2013157399 | A1 | 10/2013 | |

OTHER PUBLICATIONS

Machine Translation of WO-2013108459 Yamashita (Obtained from USPTO Search) (Year: 2024).*

ISA Japan Patent Office, International Search Report Issued in Application No. PCT/JP2021/012111, May 25, 2021, WIPO, 4 pages.

European Patent Office, Extended European Search Report Issued in Application No. 21780666.0, Mar. 4, 2024, Germany, 7 pages.

China National Intellectual Property Administration, Office Action and Search Report Issued in Application No. 202180025222.7, Aug. 28, 2025, 18 pages.

* cited by examiner

| Initial drive frequency | Target pressure | | |
|---|---|---|---|
| | ~10kPa | 10~30kPa | 30kPa~ |
| 150Hz | No switching 150 Hz drive | Switch to 250 Hz when 10 kPa is detected | Switch to 270 Hz when 30 kPa is detected |
| 250Hz | No switching 250 Hz drive | No switching 250 Hz drive | Switch to 270 Hz when 30 kPa is detected |
| 270Hz | No switching 270 Hz drive | No switching 270 Hz drive | No switching 270 Hz drive |

Fig. 20

| Initial drive frequency | Target pressure | | |
|---|---|---|---|
| | ~10kPa | 10~30kPa | 30kPa~ |
| 150Hz | No switching 150 Hz drive | Switch to 250 Hz after 6 sec | Switch to 270 Hz after 39 sec |
| 250Hz | No switching 250 Hz drive | No switching 250 Hz drive | Switch to 270 Hz after 45 sec |
| 270Hz | No switching 270 Hz drive | No switching 270 Hz drive | No switching 270 Hz drive |

Fig. 21A

| Initial drive frequency | Target pressure | | |
|---|---|---|---|
| | ~10kPa | 10~30kPa | 30kPa~ |
| 150Hz | No switching 150 Hz drive | Switch to 250 Hz after 24 sec | Switch to 270 Hz after 156 sec |
| 250Hz | No switching 250 Hz drive | No switching 250 Hz drive | Switch to 270 Hz after 180 sec |
| 270Hz | No switching 270 Hz drive | No switching 270 Hz drive | No switching 270 Hz drive |

Fig. 21B

| Initial drive frequency | Target pressure | | |
|---|---|---|---|
| | ~10kPa | 10~50kPa | 50kPa~ |
| 300Hz | No switching 300 Hz drive | Switch to 280 Hz when 18 kPa is detected | Switch to 270 Hz when 50 kPa is detected |
| 280Hz | No switching 280 Hz drive | No switching 280 Hz drive | Switch to 270 Hz when 50 kPa is detected |
| 270Hz | No switching 270 Hz drive | No switching 270 Hz drive | No switching 270 Hz drive |

Extend pressure increase time

| Initial drive frequency | Target pressure | | |
|---|---|---|---|
| | ~10kPa | 10~50kPa | 50kPa~ |
| 300Hz | No switching 300 Hz drive | Switch to 280 Hz after 100 sec | Switch to 270 Hz after 280 sec |
| 280Hz | No switching 280 Hz drive | No switching 280 Hz drive | Switch to 270 Hz after 380 sec |
| 270Hz | No switching 270 Hz drive | No switching 270 Hz drive | No switching 270 Hz drive |

PUMP CONTROL DEVICE AND PUMP CONTROL SYSTEM

CROSS REFERENCE TO RELATED APPLICATIONS

The present application is a U.S. National Phase of International Application No. PCT/JP2021/012111, entitled "PUMP CONTROL DEVICE AND PUMP CONTROL SYSTEM," and filed on Mar. 24, 2021. International Application No. PCT/JP2021/012111 claims priority to Japanese Patent Application No. 2020-064576 filed on Mar. 31, 2020. The entire contents of each of the above-listed applications are hereby incorporated by reference for all purposes.

TECHNICAL FIELD

The present invention generally relates to control devices, in particular to a control device for a pump using a vibration actuator which can perform resonance drive.

BACKGROUND

Conventionally, for example, pumps disclosed by patent documents 1, 2 or the like have been known as a pump using an actuator which can drive at its resonance frequency.

The pump of the patent document 1 uses the actuator to displace a movable wall such as a piston and a diaphragm. This displacement of the movable wall changes a volume in a pump chamber in order to flow working fluid into the pump chamber and discharge the working fluid from the pump chamber. In this pump, a movement cycle of the movable wall itself is changed according to a displacement time, a displacement amount or a displacement speed of the movable wall in a step of compressing the volume in the pump chamber.

Further, a pump device of the patent document 2 includes variation imparting means for imparting a predetermined variation to one or more parameters of a frequency, an amplitude and a phase of an alternating-current voltage to be applied to a vibrating body, and frequency response characteristic measuring means for obtaining a frequency response characteristic at one or more predetermined frequencies, which can receive the variation outputted by the variation imparting means as an input and output a physical quantity which can change according to vibration of the vibrating body. This pump device is controlled so that a frequency range of the alternating-current voltage outputted by alternating-current voltage generating means is determined according to an estimated value of a resonance frequency outputted from resonance frequency estimating means.

RELATED ART DOCUMENTS

Patent Documents

Patent document 1: JP 4396095B
Patent document 2: JP 2012-135174A

SUMMARY

Problems to be Solved by the Invention

In this regard, while a pump device has been recently downsized, there are needs that a pump of the pump device can provide large pump pressure and large pump flow rate.

However, it is required for the pump of the patent document 1 to measure the displacement amount, the displacement speed or the like of the movable wall. Thus, in order to enable the measurement of the displacement amount, the displacement speed or the like of the movable wall, it is required to provide a measurement part for measuring the displacement amount or the displacement speed of the movable wall in the pump. In a case of providing the measurement part in the pump, there is a problem that it is difficult to downsize the pump because an arrangement space for the measurement part needs to be ensured. Further, the configuration of the patent document 2 needs to perform some processes such as a process for obtaining the frequency response characteristic at the one or more of the predetermined frequencies with respect to the physical quantity which can change according to the vibration of the vibrating body and a process for estimating the resonance frequency of the vibrating body which can change according to a parameter change of a drive voltage. Thus, there is a problem that the configuration of the patent document 2 takes a lot of control time.

The present invention has been made in view of the above-described conventional problems. Accordingly, it is an object of the present invention to provide a pump control device and a pump control system which can be downsized, ensure more preferable pump pressure and pump flow rate, and stably drive.

Means for Solving the Problems

This object is achieved by the present inventions as defined in the following (1) to (7).

(1) A pump control device for controlling a pump,
wherein the pump includes:
a vibration actuator for vibrating a vibrating body due to electromagnetic drive caused by electrical current supply to a coil,
a sealed chamber which includes a movable wall which can be displaced by vibration of the vibrating body so that a volume in the sealed chamber can be changed by displacement of the movable wall and fluid can be suctioned into an inside of the sealed chamber or discharged from the inside of the sealed chamber when the volume in the sealed chamber is changed, and
a discharge portion for communicating the fluid between the sealed chamber and a tank for storing the fluid discharged from the sealed chamber therein to increase pressure of the fluid, and
wherein the pump control device comprises:
an obtaining part for obtaining pressure value information indicating a value of the pressure of the fluid in the tank or a value corresponding to the pressure, and
a control unit for controlling a drive frequency of an electrical current to be supplied to the coil based on the obtained pressure value information.

(2) The pump control device according to the above (1), wherein the control unit controls the drive frequency so that the electrical current is supplied to the coil with a resonance frequency of the vibrating body which can be changed according to the pressure of the fluid in the tank.

(3) The pump control device according to the above (2), wherein the control unit switches the drive frequency between a first drive frequency for maximizing a flow rate of the fluid from the pump into the tank and a second drive frequency for maximizing the pressure of the fluid in the tank.

(4) The pump control device according to the above (3), wherein the control unit switches the drive frequency from the first drive frequency to the second drive frequency in a phase of increasing the pressure of the fluid in the tank.

(5) A pump control system, comprising:
the pump control device defined by the above (1);
the pump; and
a pressure detection unit for measuring the pressure of the fluid in the tank to obtain the pressure value information indicating the value of the pressure,
wherein the obtaining part obtains the pressure value information from the pressure detection unit.

A pump control system, comprising:
the pump control device defined by the above (1);
the pump; and
a timer for measuring a drive time of the vibrating body while the pressure of the fluid in the tank is increased to obtain the pressure value information indicating the drive time,
wherein the obtaining part obtains the pressure value information from the timer.

(7) The pump control system according to the above (6), wherein the pump control device contains a storage part for storing a table indicating a relationship between a previously set drive time of the vibrating body and the pressure of the fluid in the tank,
wherein the pressure of the fluid in the tank increases according to the drive time, and
wherein the control unit uses the table to control the drive frequency.

Effects of the Invention

According to the present invention, it is possible to provide a pump which can be downsized, ensure more preferable pump pressure and pump flow rate, and stably drive.

BRIEF DESCRIPTION OF THE FIGURES

Each of FIG. 10A

Each of FIG. 13A

FIG. 20 is a view showing a table in a case where a drive frequency is switched according to a pressure value with the pump control system of the first embodiment.

Each of FIG. 21A and FIG. 21B is a view showing a table in a case where the drive frequency is switched according to a time with the pump control system of the first embodiment.

DETAILED DESCRIPTION

Hereinafter, description will be given to embodiments of the present invention with reference to the accompanying drawings.

First Embodiment

Entire Configuration of Pump Control System 100

Figure 1:
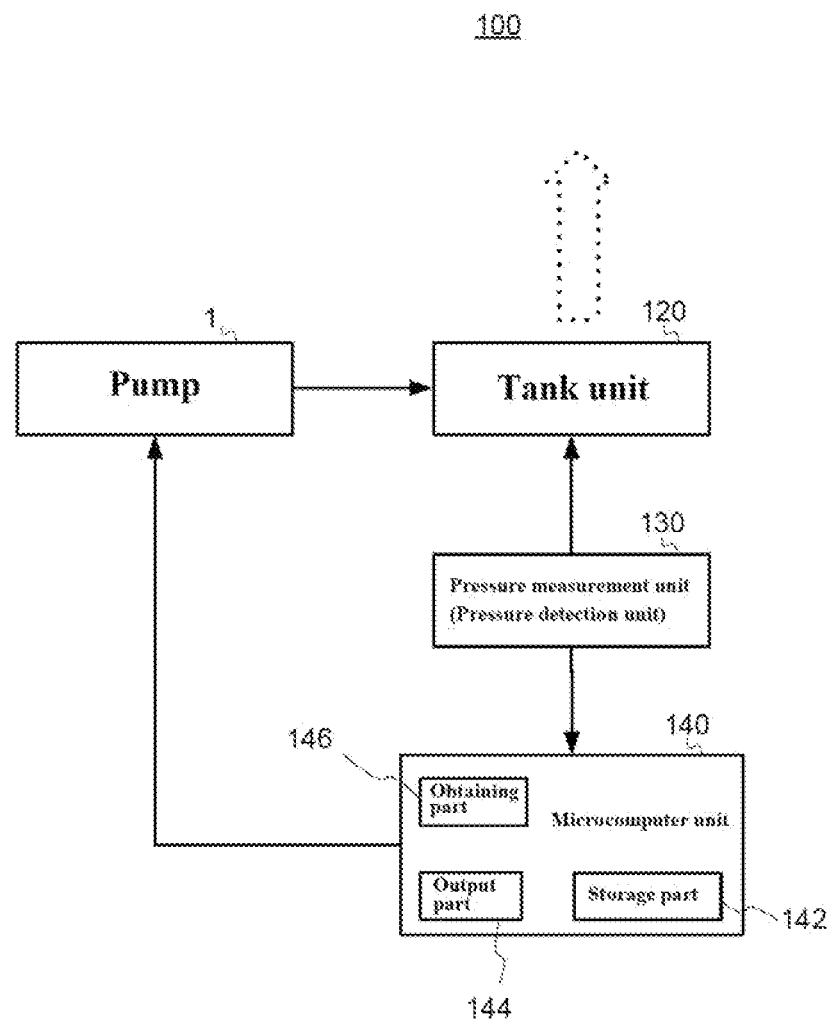
FIG. 1 is a block diagram showing a schematic configuration of a pump control system according to a first embodiment of the present invention.

FIG. 1 is a block diagram showing a schematic configuration of a pump control system 100 according to the present embodiment of the present invention. As shown in FIG. 1, the pump control system 100 according to the present embodiment contains a pump 1, a tank unit 120, a pressure measurement unit (pressure detection unit) 130, and a microcomputer unit (control unit) 140.

The pump control system 100 is configured to be able to adjust pressure of fluid (air (gas) in the present embodiment) in a tank unit 120 and then output the fluid. The fluid is discharged from a pump 1.

A frequency of the pump 1 is controlled by a drive signal (electrical current supply) outputted from the microcomputer unit 140. Specifically, a vibration actuator constituting the pump 1 is electromagnetically driven when the drive signal of a resonance frequency is inputted to the vibration actuator to supply the air which is the fluid into the tank unit 120. First, description will be given to one example of the pump 1 with reference to FIGS. 2 to 11.

Entire Configuration of Pump 1

Figure 2:
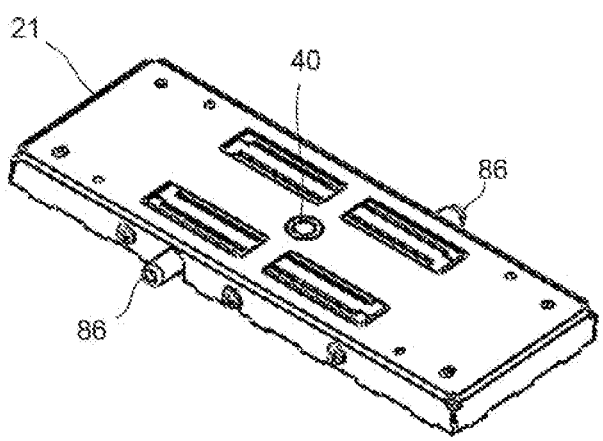
FIG. 2 is an external perspective view of a pump of the pump control system according to the first embodiment of the present invention.
Figure 3:
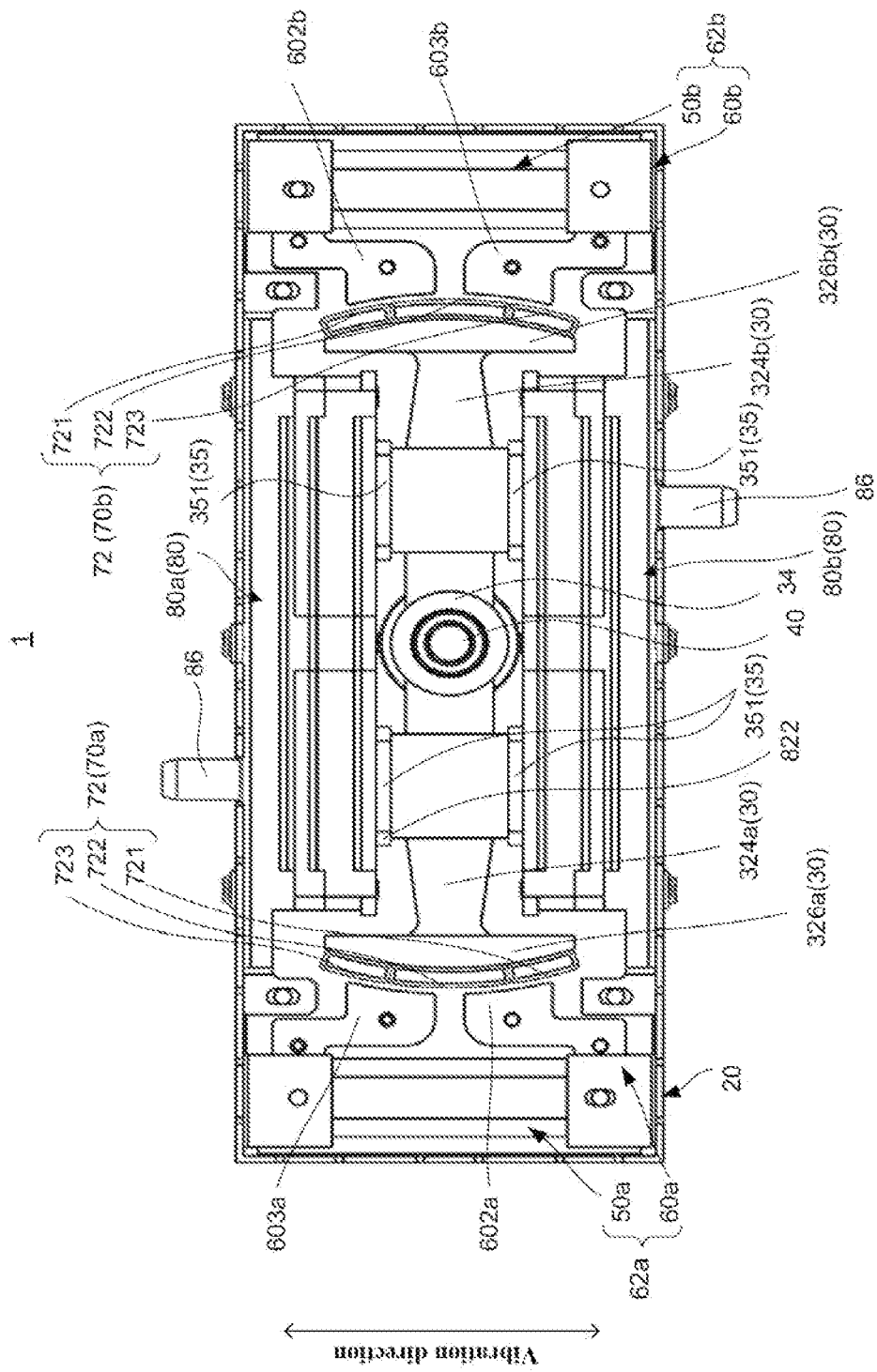
FIG. 3 is a planar view showing a main configuration of the pump of the pump control system according to the first embodiment of the present invention.
Figure 4:
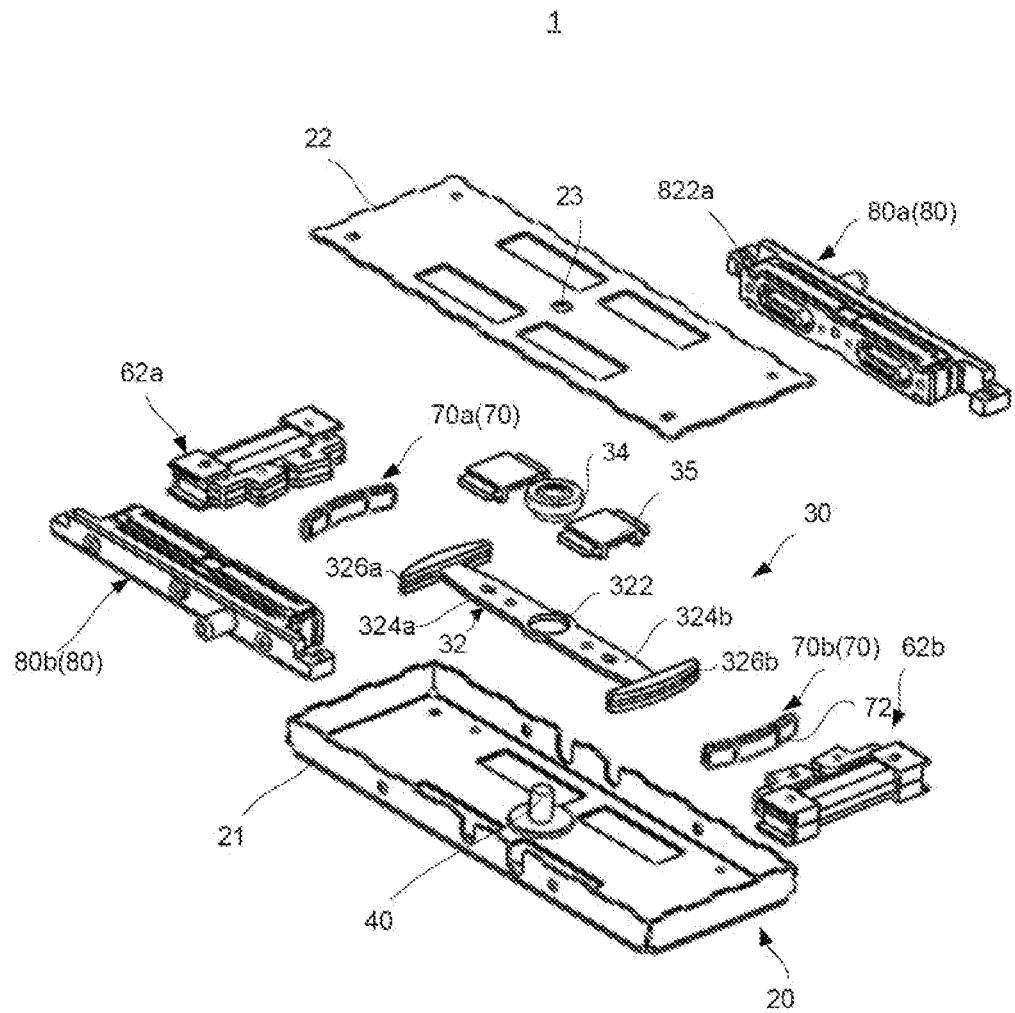
FIG. 4 is an exploded perspective view of the pump of the pump control system according to the first embodiment of the present invention.
Figure 5:
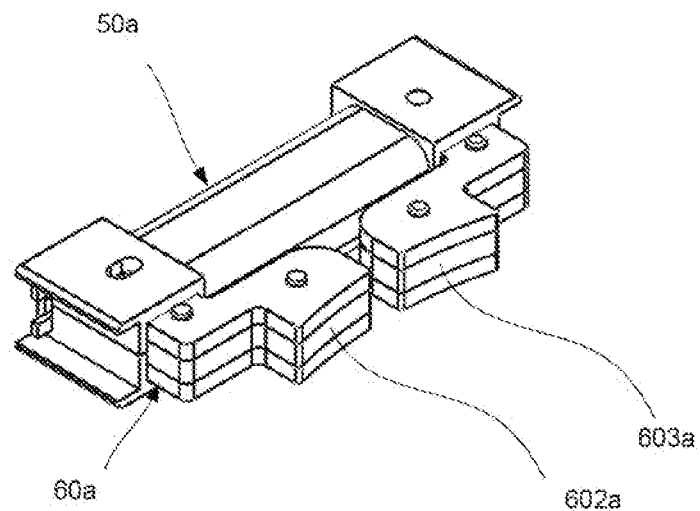
FIG. 5 is a perspective view of a coil core portion in the pump of the pump control system according to the first embodiment of the present invention.
Figure 6:
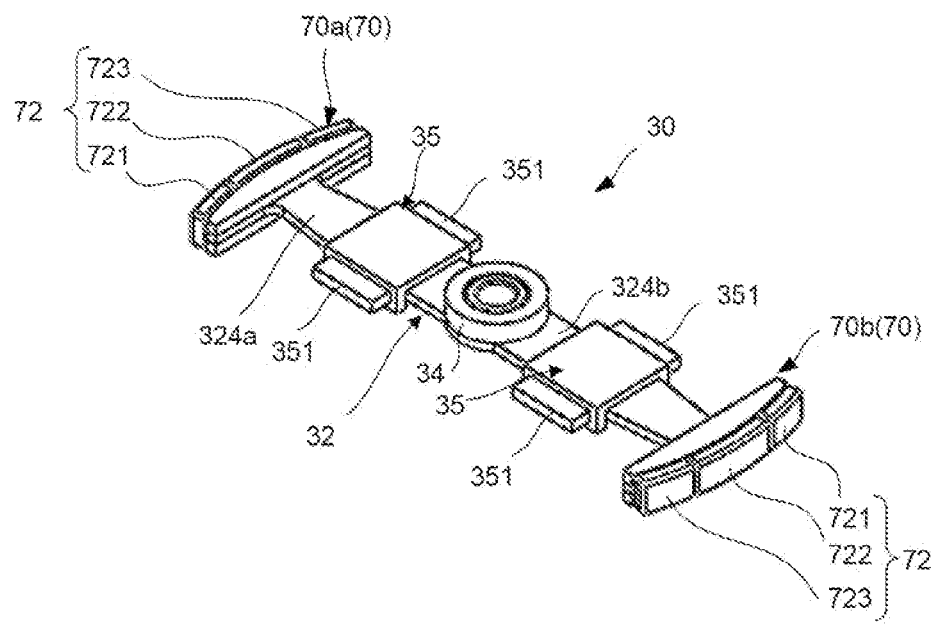
FIG. 6 is a perspective view of a vibrating body in the pump of the pump control system according to the first embodiment of the present invention.
Figure 7:
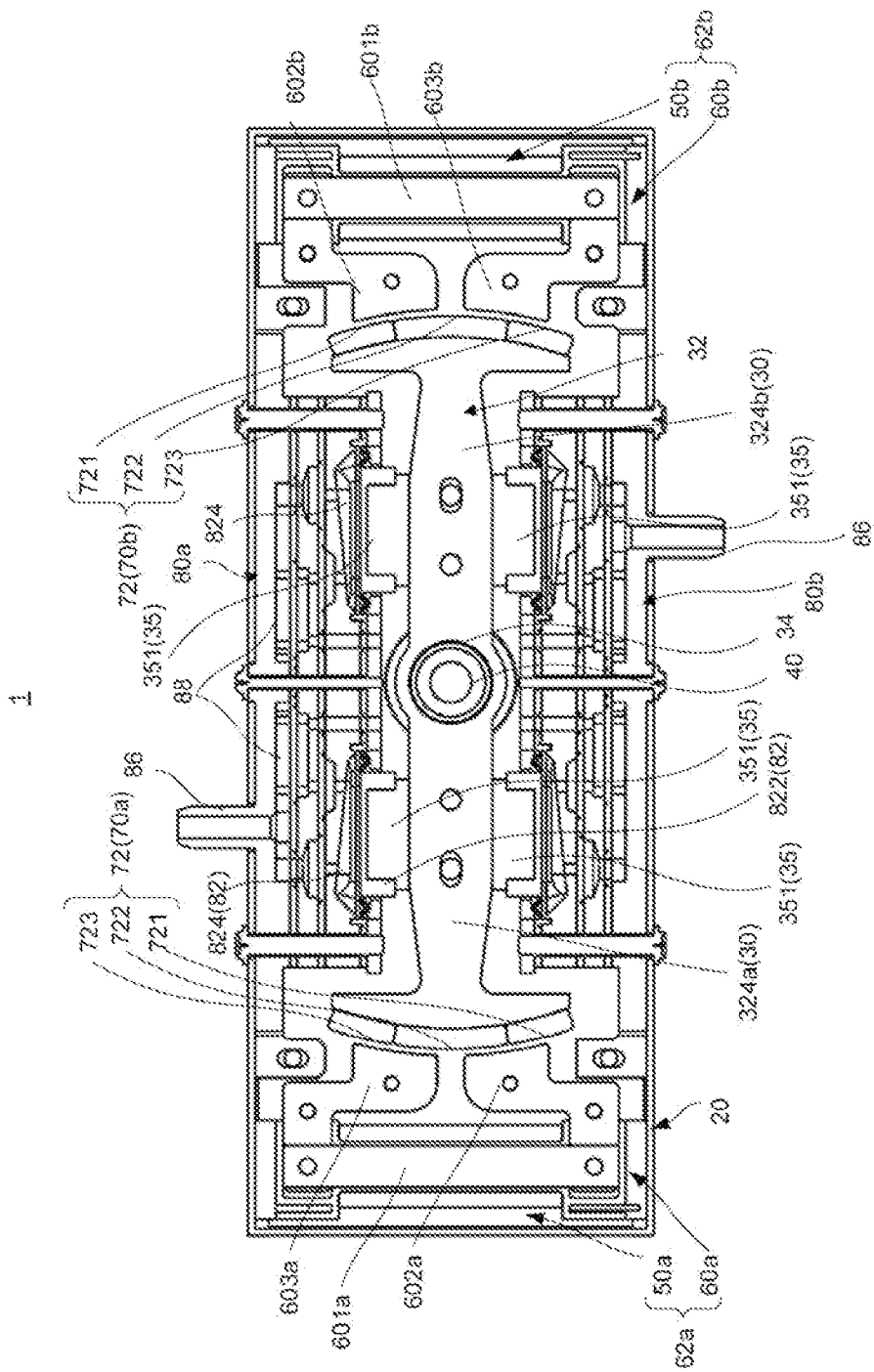
FIG. 7 is a horizontal cross-sectional view showing an internal configuration of the pump of the pump control system according to the first embodiment of the present invention.
Figure 8:
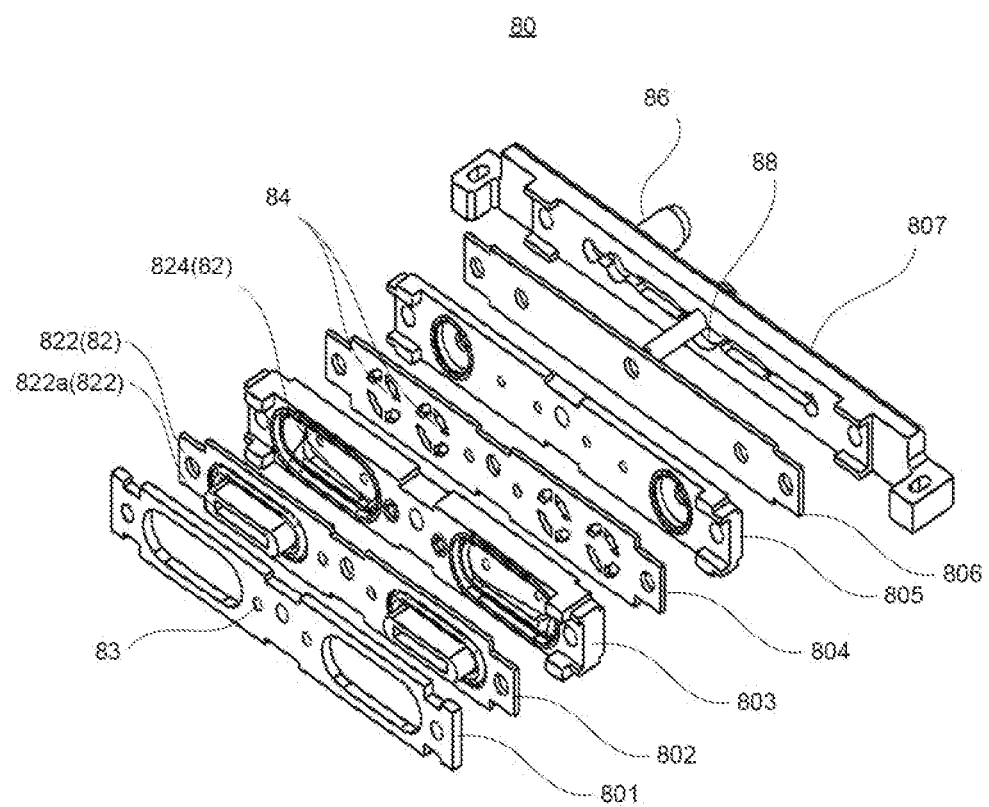
FIG. 8 is an exploded perspective view of a pump unit in the pump of the pump control system according to the first embodiment of the present invention.
Figure 9:
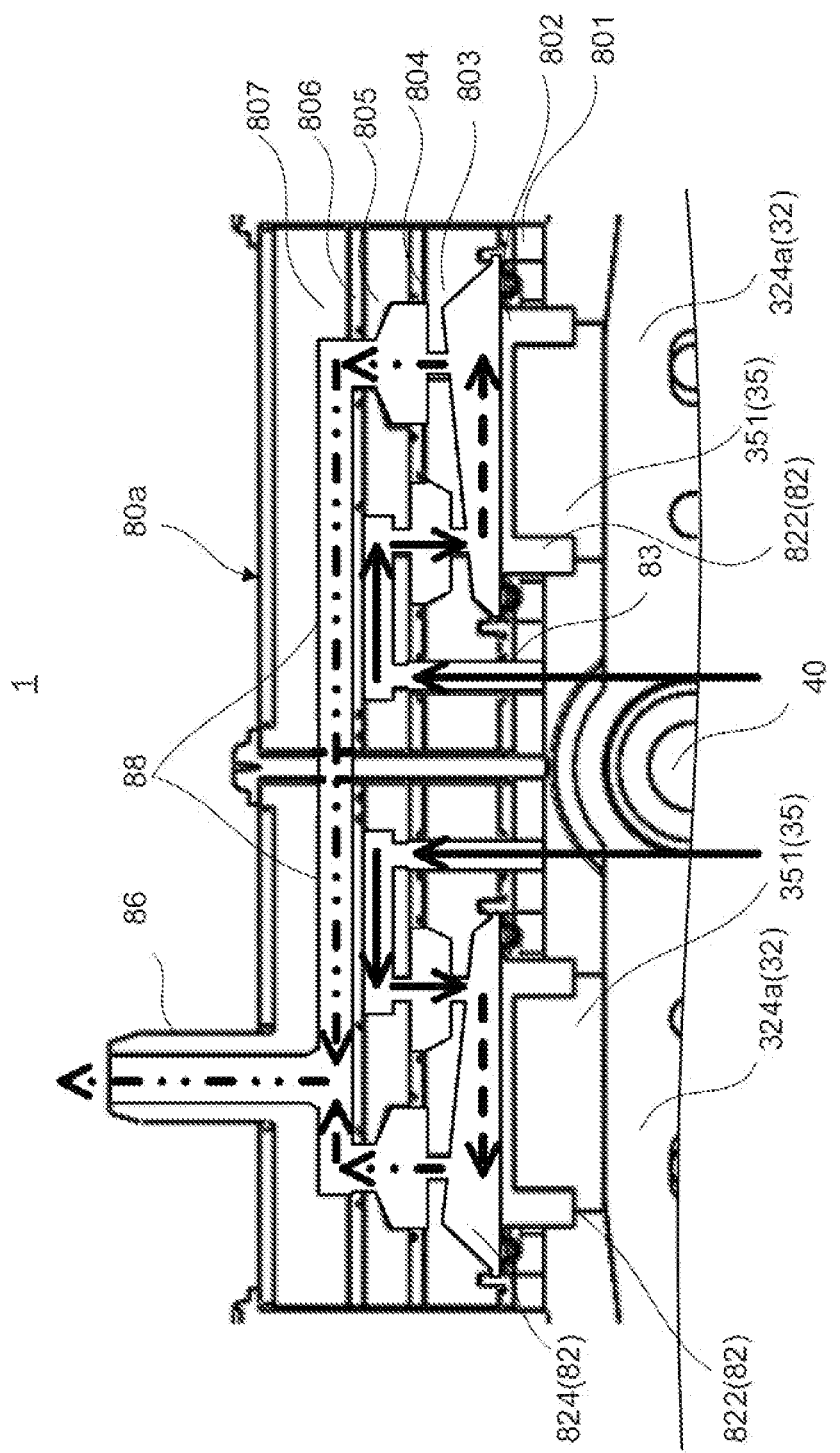
FIG. 9 is a view showing an air flow path of the pump unit of the pump of the pump control system according to the first embodiment of the present invention.

FIG. 2 is an external perspective view of the pump unit of the pump of the pump control system according to the first embodiment of the present invention. FIG. 3 is a planar view showing a main configuration of the pump of the pump control system according to the first embodiment of the present invention. FIG. 4 is an exploded perspective view of the pump of the pump control system according to the first embodiment of the present invention. FIG. 5 is a perspective view of a coil core portion in the pump of the pump control system according to the first embodiment of the present invention. FIG. 6 is a perspective view of a vibrating body in the pump of the pump control system according to the first embodiment of the present invention. FIG. 7 is a horizontal cross-sectional view showing an internal configuration of the pump of the pump control system according to the first embodiment of the present invention. FIG. 8 is an exploded perspective view of a pump unit in the pump of the pump control system according to the first embodiment of the present invention.

When description is given to the pump with reference to FIGS. 2 to 8 and FIGS. 9 to 12, it is assumed that a vibration direction of a vibrating body which performs reciprocating rotation in a vibration actuator of the pump of the pump control system is defined as a direction shown in FIG. 3. The description will be given with assuming that two directions perpendicular to this direction are respectively defined as a horizontal direction (a left-right direction) and a height direction (a vertical direction, also referred to as a thickness direction). Further, in the present embodiment, each expression indicating the directions such as "left-right (lateral)" and "height (vertical)" used to explain a configuration and operation of each part of the pump 1 is not an absolute expression but a relative expression. Although these expressions are appropriate when each part of the pump take a posture shown in each figure, these expressions should be appropriately interpreted depending on the posture of each part of the pump if the posture is changed.

The pump 1 shown in FIG. 2 and FIG. 3 can discharge the air by utilizing an action of a vibration actuator 10 which can be electromagnetically driven. Although the description will be given with assuming that the pump has a function of discharging and suctioning air in the present embodiment, a target object to be discharged and suctioned by the pump is not limited to air as long as it is fluid. In particular, it is preferable that the target object to be discharged and suctioned by the pump is gas.

As shown in FIG. 2, the pump 1 has a flat plate-like shape in which a height (a length in the vertical direction in the drawings, which corresponds to a thickness) is shorter than both of a horizontal length (a length in the left-right direction in the drawings) and a vertical length (a length in the depth direction in the drawings, which can be also referred to as the vibration direction). Further, the vertical length is shorter than the horizontal length. In this regard, FIG. 2 is the perspective view of the pump 1 viewed from a rear side thereof.

The pump 1 includes the vibration actuator 10 in which a vibrating body (a movable body) 30 is provided so as to freely perform reciprocating rotation with respect to a fixed body 20 through a shaft portion 40 and pump units 80 (80a, 80b) for discharging and suctioning air due to driving of the vibration actuator 10.

In the present embodiment, the vibrating body 30 is provided in a case 21 of the fixed body 20 through the shaft portion 40 so that the vibrating body 30 can freely perform the reciprocating rotation.

Due to a collaborative work of core portions 60 (60a, 60b) around which coils 50a, 50b are respectively wound and magnets 70 (70a, 70b), the vibrating body 30 can reciprocate (that is, vibrate) with respect to the fixed body 20 along an axial direction of the shaft portion 40. The pump 1 can discharge and suction the air through a discharge portion 86 by utilizing vibration of the vibrating body 30.

In the pump 1, the vibrating body 30 is provided in the case 21 having a rectangular shape in a planar view thereof so that the vibrating body 30 can freely perform the reciprocating rotation around the shaft portion 40 disposed at a center of the case 21. The magnets 70a, 70b are respectively provided on the inner surface sides of both wall portions of the case 21 separated from each other in a longitudinal direction of the vibrating body 30. A coil core portion 62a including the coil 50a and the core portion 60a is provided on an inner surface of the wall portion of the case 21 of the fixed body 20 which faces the magnet 70a. Another coil core portion 62b including the coil 50b and the core portion 60b is provided on an inner surface of the wall portion of the case 21 of the fixed body 20 which faces the magnet 70b. Each of the magnets 70a, 70b is preferably a permanent magnet, for example.

Vibration Actuator 10

The vibration actuator 10 includes the fixed body 20, the shaft portion 40 and the vibrating body 30 supported by the shaft portion 40 so that the vibrating body 30 can freely perform the reciprocating rotation with respect to the fixed body 20. Regarding a configuration of the vibration actuator 10, the magnets 70 (70a, 70b) are provided on one of the fixed body 20 and the vibrating body 30. Further, the coil core portions 62 (62a, 62b) which are disposed so that magnetized surfaces of cores of each coil core portion 62a, 62b respectively face the magnets 70 are provided on the other one of the fixed body 20 and the vibrating body 30. In the present embodiment, the magnets 70a, 70b are provided on the vibrating body 30 and the coil core portions 62 (62a, 62b) are provided on the fixed body 20. In other words, the vibrating body 30 includes the magnets 70 (70a, 70b) and the fixed body 20 includes the coil core portions 62 (62a, 62b) in the present embodiment. The vibration actuator 10 can supply an electrical current to the coils 50a, 50b to electromagnetically drive the vibrating body 30 for vibrating the vibrating body 30 which is a vibrating body.

Fixed Body 20

The fixed body 20 includes the case 21, a cover 22 and the coil core portions 62a, 62b. Further, the pump units 80 (80a, 80b) are provided on the fixed body 20.

The case 21 serves as a housing of the pump 1 and has a rectangular box-like shape opened to one side. The shaft portion 40 is provided to stand on the case 21 to pivotally support the movable body 30 disposed in the case 21.

In addition, the coil core portions 62a, 62b are respectively disposed on the inner surfaces of both wall portions of the case 21 separated from each other in a longitudinal direction of the case 21 so as to respectively face the magnets 70a, 70b on the vibrating body 30.

The cover 22 covers an opening portion of the case 21, that is an opening portion opening toward the upper side in the present embodiment. With this configuration, the case 21 and the cover 22 serve as a hollow electromagnetic shield and the pump 1 is formed in a flat plate-like shape.

The shaft portion 40 is provided on a center of a bottom surface of the case 21 in the horizontal direction and the depth direction of the case 21 so as to extend in the height direction of the case 21. The shaft portion 40 is fitted and fixed to a shaft hole 23 of the cover 22 in a state that the shaft portion 40 is passed through a bearing portion 34 of the vibrating body 30 by press-fitting or bonding after the shaft portion 40 is inserted into the shaft hole 23. With this configuration, the shaft portion 40 is supported in a state that the shaft portion 40 is passed through the bearing portion 34 of the vibrating body 30 and bridged between the bottom surface of the case 21 and the cover 22.

The coil core portions 62a, 62b are respectively disposed on the inner surfaces of both wall portions of the case 21 separated from each other in the longitudinal direction of the case 21 so as to face each other. Further, the coil core portions 62a, 62b are disposed so as to sandwich the vibrating body 30 in the longitudinal direction of the case 21.

In the present embodiment, the coil core portions 62a, 62b are configured so as to have the same configuration and respectively provided at positions symmetrical around an axis of the shaft portion 40 in the planar view.

The core portions 60a, 60b are magnetic bodies which can be magnetized when an electrical current flows in the coils 50a, 50b. The core portions 60a, 60b may be made of electromagnetic stainless material, sintered material, metal injection mold (MIM) material, a laminated steel sheet, an electrogalvanized steel sheet (SECC) or the like. In the present embodiment, each of the core portions 60a, 60b is constituted of laminated cores made of the laminated steel sheet.

The core portions 60a, 60b respectively have cores 601a, 601b around which the coils 50a, 50b are respectively wound and magnetic poles (hereinafter, for convenience, referred to as "core magnetic poles") 602a, 603a, 602b, 603b formed continuously with both end portions of the cores 601a, 601b.

In the present embodiment, each of the core magnetic poles 602a, 603a, 602b, 603b has a magnetic pole surface curved so as to have an arc planar shape corresponding to a shape of a magnetized surface of each of the magnets 70a, 70b which can perform reciprocating rotation.

The core magnetic poles 602a, 603a of the core portion 60a face the magnet 70a and the core magnetic poles 602b, 603b of the core portion 60b face the magnet 70b. The core magnetic poles 602a, 603a, 602b, 603b are aligned in a rotation direction of the reciprocating rotation of the vibrating body 30.

The core magnetic poles 602a, 603a, 602b, 603b are preferably disposed on a circumference of a circle around the shaft portion 40. This circumference is a circumferential track along a movement track of the magnets 70a, 70b.

In the coil core portions 62a, 62b, the core magnetic poles 602a, 603a, 602b, 603b of the core portions 60a, 60b around which the coils 50a, 50b are respectively wound are disposed so as to face a magnetization direction of the magnets 70a, 70b.

The coils 50a, 50b in the core portions 60a, 60b are connected to, for example, a power supply unit (not shown). When the electrical current is supplied from the power supply unit to the coils 50a, 50b, the core magnetic poles 602a, 603a, 602b, 603b are excited. When the core magnetic poles 602a, 603a, 602b, 603b are excited, the core magnetic poles 602a, 602b are excited so as to have a polarity differing from a polarity of the core magnetic poles 603a, 603b in each of the core portions 60a, 60b.

Vibrating Body 30

As shown in FIG. 3, FIG. 4, FIG. 6 and FIG. 7, the vibrating body 30 is disposed in the case 21 of the fixed body 20 so as to extend in a direction (the longitudinal direction of the case 21) perpendicular to the shaft portion 40 (the rotational axis of the vibrating body 30).

The vibrating body 30 is supported in the case 21 so that the vibrating body 30 can freely perform the reciprocating rotation around the shaft portion 40. The vibrating body 30 includes a vibrating body main portion 32, the bearing portion 34, the pair of magnets 70a, 70b disposed so that the plurality of magnetic poles (three magnetic poles in the present embodiment) of each of the magnets 70a, 70b are alternately disposed in the rotation direction (the depth direction) and pressing portions 35.

The bearing portion 34 is fixed to the vibrating body main portion 32 and the shaft portion 40 is passed through the bearing portion 34. The pair of magnets 70a, 70b are fixed to the vibrating body main portion 32 so as to sandwich the shaft portion 40 passed through the bearing portion 34.

The vibrating body main portion 32 may or may not be a magnetic body (a ferromagnetic body). In the present embodiment, the vibrating body main portion 32 is a yoke and serves as a weight of the vibrating body 30. The vibrating body main portion 32 is constituted by laminating yoke iron cores, for example. The constituent material of the vibrating body main portion 32 is not limited to metal material. Resin material or the like may be used as the constituent material of the vibrating body main portion 32.

The vibrating body main portion 32 has a center opening portion 322 formed at a center portion of the vibrating body main portion 32 and to which the bearing portion 34 is fixed and arm portions 324a, 324b respectively extending in opposite directions from the center portion. Each of the arm portions 324a, 324b has an elongated flat plate-like shape and end portions of the arm portions 324a, 324b are formed so as to protrude in a direction perpendicular to the extending direction. Further, magnet fixing portions 326a, 326b are respectively formed on tip end surfaces of the arm portions 324a, 324b.

A tip end surface of each of the magnet fixing portions 326a, 326b is formed to be curved in an arc shape. The magnets 70a, 70b are respectively fixed to the tip end surfaces of the magnet fixing portions 326a, 326b. The pressing portions 35 are respectively provided on the arm portions 324a, 324b.

Magnets 70a, 70b

The magnets 70a, 70b constitute magnetic circuits for driving the vibration actuator 10 together with the coil core portion 62a, 62b which are disposed to respectively face the magnets 70a, 70b.

Each of the magnets 70a, 70b has a magnetic pole surface 72 serving as a plurality of magnetic poles. The magnets 70a, 70b are disposed so that the magnetic pole surface 72 of the magnet 70a and the magnetic pole surface 72 of the magnet 70b are directed toward opposite sides through the shaft portion 40. In the present embodiment, the magnets 70a, 70b are respectively provided on both end portions of the vibrating body main portion 32 through which the shaft portion 40 is passed through at the center portion thereof. The end portions of the vibrating body main portion 32 are separated from each other in the extending direction of the vibrating body main portion 32. Namely, the magnets 70a, 70b are respectively provided on tip end portions of the arm portions 324a, 324b so that the magnetic pole surfaces 72 of the magnets 70a, 70b are directed toward the outside.

As shown in FIGS. 3 to 7 and FIG. 11, the magnetic pole surface 72 contains three different magnetic poles 721, 722, 723 alternately disposed. In this regard, each of the magnets 70a, 70b may be configured by alternately arranging magnets (magnet pieces) having different magnetic poles or may be magnetized so as to have different magnetic poles alternately disposed in the rotation direction. The magnets 70a, 70b are constituted of, for example, Nd sintered magnets or the like.

The magnetic poles 721, 722, 723 of each of the magnets 70a, 70b are disposed so as to be adjacent to each other in the depth direction perpendicular to an axis line of the shaft portion 40 through the shaft portion 40, that is, in the rotation direction.

The magnets 70a, 70b are respectively disposed on both end portions of the vibrating body 30 so that the magnetic pole surfaces 72 of the magnets 70a, 70b are positioned on the circumference of the circle around the shaft portion 40. The magnets 70a, 70b are provided so that a center position of a length of the center magnetic pole 722 of each of the magnetic pole surfaces 72 in the rotation direction is positioned at a center position between the core magnetic poles 602a, 603a in a normal state, that is, in a non-energization state that the electrical current is not supplied to the coils 50a, 50b.

In the present embodiment, the magnets 70a, 70b are disposed on the vibrating body 30 so as to respectively face the coil core portions 62a, 62b respectively provided on the inner surfaces of both wall portions of the housing (the case 21) and at positions which are farthest apart from the shaft portion 40 through the arm portions 324a, 324b.

Pressing Portion 35

The pressing portions 35 press movable walls 822 of a pair of sealed chambers 82 of the pump units 80 when the vibrating body 30 performs rotational movement. Specifically, each of the pressing portions 35 includes a pair of pushers 351 for pressing the movable walls 822 of the pair of the sealed chambers 82 when the arm portions 324a, 324b perform the reciprocating rotation.

The pairs of pushers 351 of the pressing portions 35 are respectively provided on the arm portions 324a, 324b so as to protrude in the width direction, that is, in the rotation direction of the arm portions 324a, 324b. Each of the pressing portions 35 may be formed so as to linearly press the movable wall 822 in a facing direction even when the vibrating body 30 rotates, for example. In the present embodiment, each pusher 351 of the pressing portions 35 moves in an arc track around the shaft portion 40 and abuts against the movable wall 822 to press the movable wall 822. The pressing portion 35 may be configured in any manner as long as it is configured to be displaced toward the movable wall side when the vibrating body 30 performs the rotational movement to press and move the movable wall 822. Preferably, the movable wall 822 is disposed so as to intersect a movement track of the pressing portion 35 and the moving pressing portion 35 is disposed so as to make surface-contact with the movable wall 822.

For example, as shown in FIG. 10, the pressing portion 35 is fixed with respect to each of the arm portions 324a, 324b through a shaft protrusion 353 axially attached to a round hole 328 so that the shaft protrusion 353 can perform pivotal movement and a guide protrusion 352 guided by a long hole 329. With this configuration, the pusher 351 swings in the arc track when the vibrating body 30 performs the reciprocating rotation. For example, a tip end of the pusher 351 may swing by loosely fitting the guide protrusion 352 into the long hole 329 to allow the pressing portion 35 to swing with respect to the arm portions 324a, 324b through the guide protrusion 352. In this case, although the pressing portion 35 moves in the arc track when the vibrating body 30 rotates, the pusher 351 can linearly move with respect to the movable wall 822 to press the movable wall 822.

In the present embodiment, the pressing portion 35 is connected to the movable wall 822 of the pump unit 80 through the pusher 351. The pusher 351 is inserted into an insertion portion 822a of the movable wall 822 serving as a diaphragm when the vibrating body 30 performs the rotational movement to push and displace the movable wall 822 in the rotation direction. The pressing portion 35 moves toward the side of the movable wall 822 to press the movable wall 822 when the vibrating body 30 rotates. Further, when the vibrating body 30 oppositely rotates, the pressing portion 35 moves toward the side opposite to the movable wall 822 and gradually decreases pressure with respect to the movable wall 822 to displace the movable wall 822 in a direction opposite to the pressing direction.

The bearing portion 34 is constituted of a sintered sleeve bearing, for example. The bearing portion 34 is fitted into the center opening portion 322 of the vibrating body main portion 32 so that the shaft portion 40 is positioned on a center axis of the vibrating body main portion 32.

When the electrical current is not supplied to the coils 50a, 50b, the vibrating body main portion 32 is biased so as to be positioned at a center of the case 21 (the fixed body 20) in the longitudinal direction by functions of magnetic springs provided by the core portions 60a, 60b and the magnets 70a, 70b.

Pump Unit 80

Each of the pump units 80 (80a, 80b) includes the movable walls 822, the sealed chambers 82 defined by the movable walls 822, a suction portion 83, valves 84, the discharge portion 86 and a discharge flow path portion 88.

Movable Wall 822

The movable wall 822 forms a wall portion for partitioning between a chamber forming portion 824 and the discharge flow path portion 88 and is provided so as to be displaceable. The movable wall 822 is displaced to change a volume in the sealed chamber 82 when the vibrating body 30 vibrates. The movable wall 822 constitutes the sealed chamber 82 together with the chamber forming portion 824.

The movable wall 822 is formed of, for example, elastically deformable material and is provided so as to close the chamber forming portion 824. For example, the movable wall 822 is a diaphragm.

The movable wall 822 has the insertion portion 822a into which the pusher 351 of the pressing portion 35 is inserted and is connected to the pressing portion 35 through the insertion portion 822a. The movable wall 822 is displaced when the movable wall 822 is pressed by the pressing portion 35 which moves in accordance with the rotation of the vibrating body 30.

The movable wall 822 is elastically deformed when the movable wall 822 is pressed toward the chamber forming portion 824 by the pressing portion 35 through the insertion portion 822a and deformed to reduce a volume of the chamber forming portion 824. Since the movable wall 822 is displaced toward the chamber forming portion 824 and protrudes into the chamber forming portion 824, the movable wall 822 can change the volume in the sealed chamber 82.

The movable wall 822 is inserted into the chamber forming portion 824 by one-side rotation movement (swing to one side of the rotation direction) of the reciprocating rotation of the vibrating body 30 to press the inside of the chamber forming portion 824 and reduce the volume in the sealed chamber 82 for discharging the air. On the other hand, when the vibrating body 30 rotates in the other side (moves toward the other side of the rotation direction), the movable wall 822 increases the volume in the sealed chamber 82 to suction the air.

Sealed Chamber 82

The sealed chamber 82 is a sealed space to which the suction portion 83 and the discharge portion 86 are connected and whose volume can be changed by the displacement of the movable wall 822. The discharge portion 86 has a discharge port communicated with the outside and discharges the air from the pump 1 to the outside through the discharge port. For example, the discharge port may be an opening communicated with the discharge portion 86 connected to a bottom surface of the sealed chamber 82. When the movable wall 822 is displaced, the volume in the sealed chamber 82 is changed. As a result, the air is suctioned into the sealed chamber 82 or the air is discharged to the outside from the inside of the sealed chamber 82. The discharge portion 86 communicates the fluid between the tank unit 120 and the sealed chamber 82.

In the pump unit 80, when the movable wall 822 is pressed by the pressing portion 35, the movable wall 822 is elastically deformed toward the inside of the sealed chamber 82 to press the air in the sealed chamber 82. The pressed air in the sealed chamber 82 is discharged to the outside through the discharge portion 86. When the movable wall 822 moves so as to return to an initial position, that is, when the pressed state by the pressing portion 35 is released and the volume in the sealed chamber 82 increases from the pressed state, the air is suctioned from the outside into the sealed chamber 82 through the suction portion 83. For example, the suction portion 83 has a suction port and can suction the air into the sealed chamber 82 through the suction port. For example, the suction port may be an opening communicated with the suction portion 83 in the chamber forming portion 824.

Each of the pump units 80 (80a, 80b) is disposed in the case 21 along the extending direction of the vibrating body 30, that is, along side wall portions of the case 21 extending in the longitudinal direction of the case 21. Further, the pump units 80 (80a, 80b) are disposed so as to sandwich the vibrating body main portion 32 of the vibrating body 30 in the depth direction of the case 21.

For example, the pump unit 80 includes a base 801, a diaphragm portion 802, a cylinder portion 803, a valve portion 804, a valve cover portion 805, a partition portion 806 and a flow path forming portion 807. Each of the base 801, the diaphragm portion 802, the cylinder portion 803, the valve portion 804, the valve cover portion 805, the partition portion 806 and the flow path forming portion 807 has an elongated plate-like shape extending in the longitudinal direction of the case 21 and constitutes the pump unit 80 having an internal space sealed by stacking these portions.

The base 801 has an opening. The insertion portion 822a of the diaphragm portion 802 is passed through the opening of the base 801 from a rear surface side of the base 801 so as to protrude toward a front surface side of the base 801. The base 801 and the flow path forming portion 807 constitute a housing of the pump unit 80 having a strip shape. The diaphragm portion 802 is formed from elastic material such as rubber. The diaphragm portion 802 has the insertion portion 822a and the movable wall 822. The chamber forming portion 824 of the cylinder portion 803 is disposed on the rear surface side of the movable wall 822 which has flexibility and can be elastically deformed. The diaphragm portion 802 and the cylinder portion 803 are attached to each other so that the movable wall 822 of the diaphragm portion 802 and the chamber forming portion 824 of the cylinder portion 803 define the sealed chamber 82 which is a sealed space.

The cylinder portion 803 has the chamber forming portion 824 and two communication holes formed in a surface facing the movable wall 822 in the sealed chamber 82 so as to be respectively communicated with the discharge portion 86 and the suction portion 83. The two communication holes are respectively connected to the discharge flow path portion 88 and the suction portion 83 of the flow path forming portion 807 and the valve cover portion 805 through the valves 84 of the valve portion 804 which are attached from the rear surface side of the cylinder portion 803 so as to overlap with the two communication holes.

The valve portion 804 is attached to the valve cover portion 805. The valve 84 connected to the discharge portion 86 is configured to communicate with the discharge portion 86 of the flow path forming portion 807 when the volume in the sealed chamber 82 decreases. On the other hand, the valve 84 connected to the discharge portion 86 is configured to be closed when the volume in the sealed chamber 82 increases. The valve 84 connected to the suction portion 83 is configured to be closed when the volume in the sealed chamber 82 decreases. On the other hand, the valve 84 connected to the suction portion 83 is configured to communicate with the suction portion 83 of the flow path forming portion 807 when the volume in the sealed chamber 82 increases.

In the present embodiment, each of the pump units 80 (80a, 80b) has the pair of sealed chambers 82 each constituted of the chamber forming portion 824 and the movable wall 822. Each of the pump units 80 (80a, 80b) is disposed so that its own pair of sealed chambers 82 respectively face side surfaces of the arm portions 324a, 324b extending in directions opposite to each other through the shaft portion 40. Namely, the pump units 80 (80a, 80b) are disposed so as to face each other at positions where the arm portions 324a, 324b are sandwiched between the pairs of sealed chambers 82 of the pump units 80 (80a, 80b) in the direction of the reciprocation and rotation movement of the arm portions 324a, 324b.

Figure 10A:
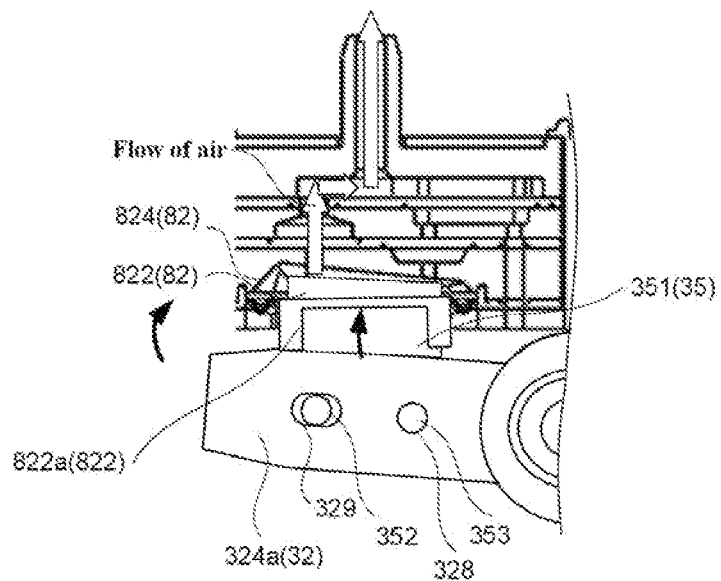
FIG. 10B is a view showing a discharge and suction operation for air in the pump of the pump control system according to the first embodiment of the present invention.
Figure 10B:
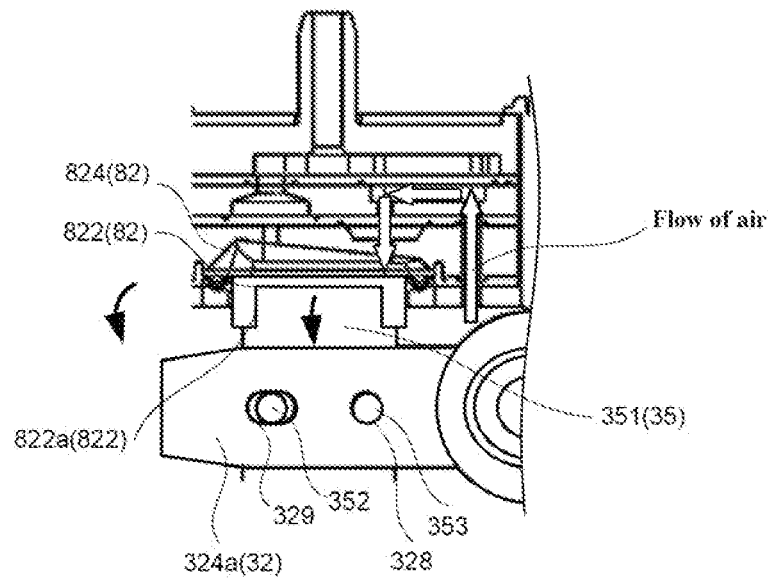

Each of FIG. 10A and FIG. 10B is a view showing an air discharge operation or an air suction operation of the pump of the pump control system according to the first embodiment of the present disclosure.

When the pressing portion 35 moves toward the movable wall 822, the pusher 351 contacts and presses the movable wall 822 through the insertion portion 822a as shown in FIG. 10A. As a result, the movable wall 822 is displaced toward the side of the chamber forming portion 824 and thus the air in the sealed chamber 82 is pressed and compressed. The compressed air flows to the side of the discharge portion 86 which is only one communicated with the sealed chamber 82 through the opened valve 84 (see white arrows in FIG. 10A).

On the other hand, when the pressing portion 35 reversely moves in the rotation direction, that is, moves away from the side of the pump unit 80, the movable wall 822 elastically returns in accordance with the movement of the pressing portion 35 and the volume in the sealed chamber 82 is returned, that is, increased as shown in FIG. 10B. At this time, the valve 84 connected to the discharge portion 86 is tightened to close the discharge path and the valve 84 connected to the suction portion 83 is opened. Thus, the air is suctioned into the sealed chamber 82 through the suction portion 83 (indicated by white arrows in the FIG. 10B).

Magnetic Circuit Configuration

In the present embodiment, the core portions 60a, 60b which are magnetic members are disposed in the case 21 so as to respectively face the magnets 70a, 70b with being apart from the magnets 70a, 70b in the longitudinal direction as shown in FIG. 3 and FIG. 7. The magnets 70a, 70b are respectively disposed at both ends of the vibrating body 30 so as to face each other through the shaft portion 40. The core portions 60a, 60b are respectively disposed on inner surfaces of both wall portions of the case 21 in the longitudinal direction so as to face each other with being apart from each other in the longitudinal direction.

Magnetic attraction force is generated between the core portion 60a and the magnet 70a and between the core portion 60b and the magnet 70b. Since these two kinds of magnetic attraction force generated in the longitudinal direction (the extending direction of the arm portion 324a, 324b) are generated in opposite directions on one straight line through the shaft portion 40, these two kinds of magnetic attraction force cancel each other.

Figure 11:
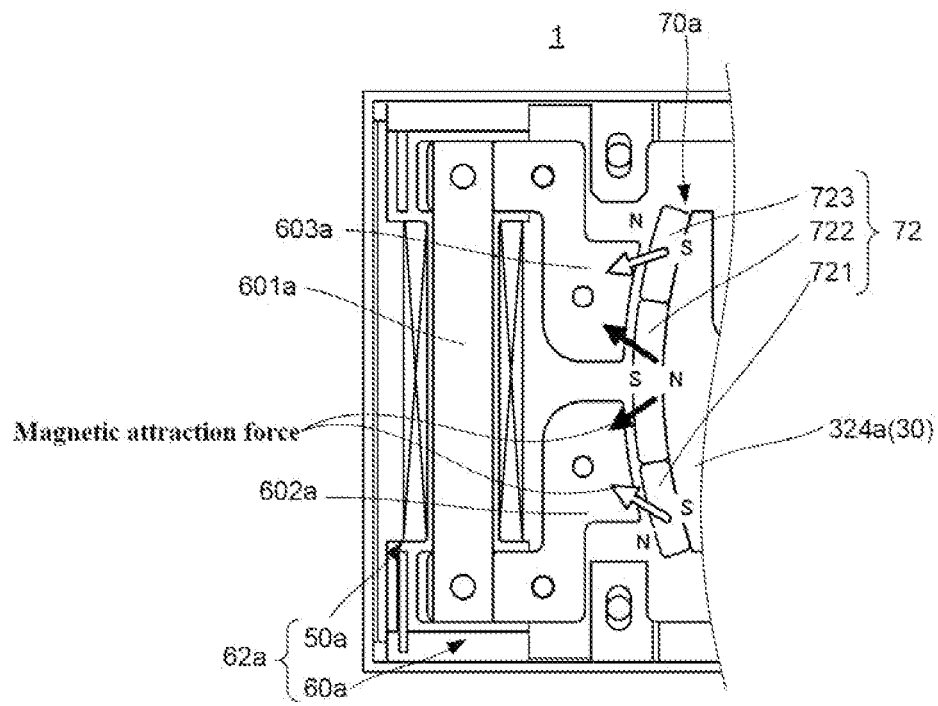
FIG. 11 is a view showing a magnetic spring of the pump of the pump control system according to the first embodiment of the present invention.

FIG. 11 is a view showing a magnetic spring of the pump of the pump control system according to the first embodiment of the present invention. In the pump 1, a magnetic circuit provided by the coil core portion 62a and the magnet 70a and a magnetic circuit provided by the coil core portion 62b and the magnet 70b are configured to be point-symmetrically around the shaft portion 40. Thus, only the magnetic circuit provided by the coil core portion 62a and the magnet 70a will be described in FIG. 11 and description for the magnetic circuit provided by the coil core portion 62b and the magnet 70b will be omitted.

In FIG. 11, the magnet 70a has a configuration in which the magnetic poles 721, 722, 723 on the magnetic pole surface 72 facing the core portion 60a are respectively magnetized as N pole, S pole and N pole. Each of the magnetic poles 721 to 723 on the magnetic pole surface 72 of the magnet 70a respectively attracts the core magnetic poles 602a, 603a close to each of the magnetic poles 721 to 723.

The center magnetic pole 722 of the magnet 70a attracts both of the core magnetic poles 602a, 603a. The magnetic pole 721 of the magnet 70a attracts the core magnetic pole 602a. The magnetic pole 723 of the magnet 70a attracts the core magnetic pole 603a. As a result, the center magnetic pole 722 of the magnet 70a is located at the center of the coil core portion 62a, that is, at a position between the core magnetic poles 602a, 603a.

In the pump 1, when the electrical current flows in the coil 50a of the coil core portion 62a, the core magnetic poles 602a, 603a of the core portion 60a are excited with different polarities. As a result, thrust force is generated with respect to the vibrating body 30 in accordance with the relationship with the magnet 70a disposed so as to face the coil core portion 62a. The same discussion can be applied to the magnetic circuit provided by the coil core portion 62b and the magnet 70b. By periodically changing the direction of the electric current supplied to the coils 50a, 50b, the vibrating body 30 including the magnets 70a, 70b performs the reciprocating rotational movement (reciprocating rotational vibration) in the rotation direction around the shaft portion 40.

Operation of Pump 1

Figure 12:
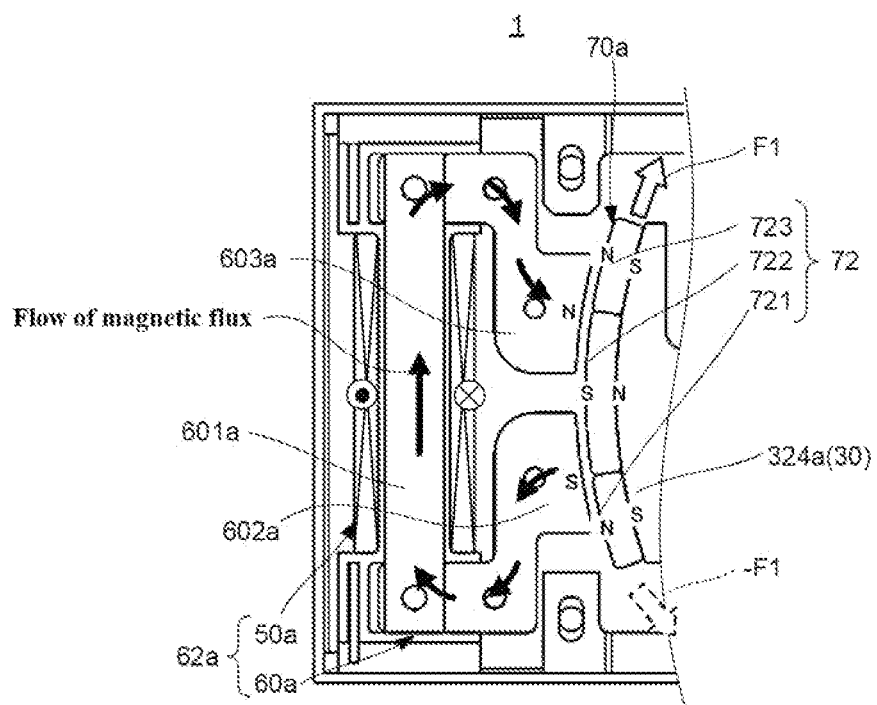
FIG. 12 is a view showing a configuration of a magnetic circuit of the pump of the pump control system according to the first embodiment of the present invention.

An example of the operation of the pump 1 will be described with reference to FIG. 12. FIG. 12 is a view showing the magnetic circuit configuration of the pump of the pump control system 100 according to the first embodiment of the present invention. In this regard, similarly to the description with reference to FIG. 11, only the magnetic circuit provided by the coil core portion 62a and the magnet 70a will be described in the description for the example of the operation of the pump 1 with reference to FIG. 12 and description for the magnetic circuit provided by the coil core portion 62b and the magnet 70b will be omitted.

It is assumed that the magnet 70a has three different polarities on the magnetic pole surface 72 so that the three different polarities are alternately arranged in the rotation direction of the vibrating body 30. In the magnet 70a shown in FIG. 12, the central magnetic pole 722 is the S pole and each of the magnetic poles 721, 723 sandwiching the center magnetic pole 722 is the N pole on the magnetic pole surface 72 facing the core portion 60a.

When the electrical current is supplied to the coil 50a of the coil core portion 62a to excite the core portion 60a, the core magnetic pole 602a of the core portion 60a is magnetized with the S pole and the core magnetic pole 603a of the core portion 60a is magnetized with the N pole as shown in FIG. 12.

Since the magnetic pole 723 of the magnet 70a magnetized with the N pole faces the core magnetic pole 603a magnetized with the N pole as shown in FIG. 12, the magnetic pole 723 of the magnet 70a repels with respect to the core magnetic pole 603a. In addition, since the magnetic pole 722 of the magnet 70a is magnetized with the S pole, magnetic attraction force is generated between the magnetic pole 722 and the core magnetic pole 603a magnetized with the N pole and the magnetic pole 722 repels with respect to the core magnetic pole 602a magnetized with the S pole. Further, since the magnetic pole 721 of the magnet 70a is magnetized with the N pole, magnetic attraction force is generated between the magnetic pole 721 and the core magnetic pole 602a magnetized with the S pole.

With this configuration, thrust force in the direction F1 is generated between the magnet 70a and the coil core portion 62a, and thereby the vibrating body 30 is driven in the direction F1. In a state that the electrical current is not supplied to the coil 50a, the vibrating body 30 is located at a rotation reference position, that is a neutral position for the reciprocation movement by the magnetic attraction force of the magnetic spring.

Further, the electrical current is supplied to the coil 50a in the opposite direction to reverse the polarity of the core portion 60a. Namely, the magnetic pole 603a of the core portion 60a facing the magnet 70a is magnetized with the S pole and the magnetic pole 602a of the core portion 60a is magnetized with the N pole. As a result, the magnet 70a facing the core portion 60a rotates in a direction (direction −F1) opposite to the direction F1. The vibrating body 30 is driven in the direction −F1 which is 180 degrees opposite to the direction F1.

In the vibrating body 30, the relationship between the magnet 70b disposed on the opposite side of the magnet 70a through the shaft portion 40 and the coil core portion 62b is point-symmetrical with respect to the relationship between the magnet 70a and the coil core portion 62a around the shaft portion 40. Thus, thrust force in the direction F1 or the direction −F1 is also generated between the magnet 70b and the coil core portion 62b similar to the thrust force generated between the magnet 70a and the coil core portion 62a. With this configuration, the vibrating body 30 preferably performs the reciprocating rotation around the shaft portion 40 due to the magnetic attraction force and the repulsion force which are effectively generated in the magnetic circuits at both end portions of the vibrating body 30.

This driving principle will be described in the following description. In the vibration actuator 10, when an inertial moment of the vibrating body 30 is defined as J [Kg*m²] and a spring constant in the rotation direction is defined as $K_{sp}$, the vibrating body 30 vibrates with respect to the fixed body 20 with a resonant frequency fr [Hz] calculated by the following equation (1).

Equation 1

$$f_r = \frac{1}{2\pi}\sqrt{\frac{K_{sp}}{J}} \quad (1)$$

In the pump 1, an alternating current having a frequency substantially equal to the resonant frequency fr of the vibrating body 30 is supplied to the coils 50a, 50b to excite the core portions 60a, 60b (more specifically, the core magnetic poles 602a, 603a, 602b, 603b) with the coils 50a, 50b. As a result, it is possible to efficiently drive the vibrating body 30.

The vibrating body 30 in the vibration actuator 10 is in a state that it is supported by a spring mass system structure constituted of the magnetic springs provided by the magnets 70a, 70b and the coil core portions 62a, 62b respectively having the coils 50a, 50b and the core portions 60a, 60b. Thus, when the alternating current having the frequency equal to the resonance frequency fr of the vibrating body 30 is supplied to the coils 50a, 50b, the vibrating body 30 is driven in a resonance condition.

A motion equation and a circuit equation representing the driving principle of the vibration actuator 10 are shown below. The vibration actuator 10 is driven based on the motion equation expressed by the following equation (2) and the circuit equation expressed by the following equation (3).

Equation 2

$$J\frac{d^2\theta(t)}{dt^2} = K_f i(t) - K_{sp}\theta(t) - D\frac{d\theta(t)}{dt} \quad (2)$$

J: Inertial moment [Kg*m²]
θ(t): Displacement angle [rad]
$K_f$: Thrust constant [Nm/A]
i(t): Current [A]
$K_{sp}$: Spring constant [Nm/rad]
D: Damping coefficient [Nm/(rad/s)]

Equation 3

$$e(t) = Ri(t) + L\frac{di(t)}{dt} + K_e\frac{dx(t)}{dt}$$

e(t): Voltage [V]
R: Resistance [Ω]
L: Inductance
$K_e$: Counter-electromotive force constant [V/(m/s)]

Namely, the inertial moment J [Kg*m²], a displacement angle (rotational angle) θ(t) [rad], a thrust constant (torque constant) $K_f$ [Nm/A], an electrical current i(t) [A], the spring constant $K_{sp}$ [Nm/rad], a damping factor D [Nm/(rad/s)] and the like of the vibrating body 30 in the vibration actuator 10 of the pump 1 can be appropriately changed as long as they satisfy the equation (2). A voltage e(t) [V], a resistance R [Ω], an inductance L[H] and a counter-electromotive force constant $K_e$ [V/(m/s)] can be appropriately changed as long as they satisfy the equation (3).

As described above, when the alternating current having the frequency corresponding to the resonance the resonant frequency fr determined by the inertial moment J of the vibrating body 30 and the spring constant $K_{sp}$ of the magnetic spring is supplied to the coils 50a, 50b, it is possible to efficiently obtain a large vibration output of the vibration actuator 10 of the pump 1.

In the pump 1, the volume in the sealed chamber 82 is changed by the displacement of the movable wall 822 (specifically, the deformation of the diaphragm) in the pump unit 80 when the vibrating body 30 performs the reciprocating rotation. Thus, the pump 1 can provide a pump function. In the following description, a flow rate of this pump function is set by the following equation (4) and pressure of this pump function is set by the following equation (5).

Equation 4

$$Q = Axf*60 \quad (4)$$

Q: Flow rate [L/min]
A: Piston area [m²]
x: Piston displacement [m]
f: Drive frequency [Hz]

Equation 5

$$P = P_0\left(\frac{V + \Delta V}{V - \Delta V} - 1\right) \quad (5)$$

P: Increased pressure [kPa]
$P_0$: Atmospheric pressure [kPa]
V: Sealed chamber volume [m³]
ΔV: Changed volume [m³]
ΔV=Ax
A: Piston area [m²]
x: Piston displacement [m]

Namely, a flow rate Q [L/min], a piston area A [m²], a piston displacement x [m], a drive frequency f [Hz] and the like of the pump 1 can be appropriately changed as long as they satisfy the equation (4). Further, an increasing pressure [kPa], an atmospheric pressure $P_0$ [kPa], a sealed chamber volume V [m³] and a changed volume ΔV [m³]=the piston area [m²] A*the piston displacement [m] can be appropriately changed as long as they satisfy the equation (5).

As described above, the pump 1 of the present embodiment has the vibration actuator 10 which can be electromagnetically driven and the pump units 80 (80*a*, 80*b*) which suction and discharge the air due to the electromagnetic drive of the vibration actuator 10. In the vibration actuator 10, the fixed body 20 includes one of the coil core portion 62*a* having the coil 50*a* and the core portion 60*a* around which the coil 50*a* is wound and the magnet 70*a* disposed so as to face the end portion of the core portion 60*a*. Further, the pump units 80 are provided on the fixed body 20. The vibrating body 30 includes the other one of the coil core portion 62*a* and the magnet 70*a*. Further, the vibrating body 30 is elastically held by the magnetic attraction force of the magnet 70*a*. The shaft portion 40 reciprocally and rotatably supports the vibrating body 30. The pump unit 80*a* includes the movable wall 822 which can be moved by the rotational movement of the vibrating body 30 and the sealed chamber 82 which communicates with the discharge portion 86 for the air and the suction portion 83 for the air and whose volume can be changed by the displacement of the movable wall 822. The vibrating body 30 has the pressing portions 35 which move in the arc track around the shaft portion 40 when the vibrating body 30 performs the reciprocating rotational movement and contacts with the movable walls 822 to press the movable walls 822. The movable walls 822 are disposed in the moving direction of the pressing portions 35 and displaced to discharge the air in the sealed chamber 82 through the discharge portion 86 when the movable walls 822 are pressed by the pressing portion 35.

Tank Unit 120

Referring back to FIG. 1, the tank unit 120 adjusts the pressure of the fluid discharged from the pump 1. Specifically, the tank unit 120 stores the air discharged from the sealed chambers 82 of the pump 1 therein to increase pressure of the air discharged from the tank unit 120. The tank unit 120 is connected to a tank discharge flow path and can contain and store the air discharged from the sealed chambers 82 therein without outputting the air to the outside to adjust pressure in the tank unit 120. The tank unit 120 is connected to the discharge ports 86 of the pump 1 and thus the fluid can communicate between the tank unit 120 and the sealed chambers 82 of the pump 1 (the pump units 80).

The fluid, which is the air in the present embodiment, discharged from the pump 1 (the pump units 80) is supplied into the tank unit 120. The tank unit 120 may store the supplied fluid to increase the pressure of the fluid in the tank unit 120 and release the air with predetermined pressure. Any arbitrary device can be used as the tank unit 120 as long as it has a volume enough for storing the air to increase the pressure of the fluid discharged from the tank unit 120 and uses the supplied air. For example, the tank unit 120 may be a cuff of a sphygmomanometer.

Pressure Measurement Unit 130

The pressure measurement unit 130 measures a state of the air (the fluid) in the tank unit 120. Specifically, the pressure measurement unit 130 measures the pressure of the air (the fluid) in the tank unit 120 to obtain pressure value information indicating a value of the pressure and outputs the pressure value information to the microcomputer unit 140. The pressure measurement unit 130 may be configured in any manner as long as it can measure the pressure of the air (the fluid) in the tank unit 120. The pressure measurement unit 130 may be provided at the tank unit 130 or may be provided in the tank unit 120.

Microcomputer Unit 140

The microcomputer unit 140 contains an obtaining part 146, an output part 144 and a storage part 142. The obtaining part 146 obtains the value of the pressure of the air in the tank unit 120 based on the pressure value information inputted from the pressure measurement unit 130. The obtaining part 146 is connected to the pressure measurement unit 130 and obtains the measured value of the pressure of the air in the tank unit 120 based on the pressure value information inputted from the pressure measurement unit 130. The output part 144 has a function of outputting a drive frequency to the coils 50*a*, 50*b*. The output part 144 outputs the drive frequency which is based on information on the value of the pressure of the air in the tank unit 120 obtained by the obtaining part 146 to the coils 50*a*, 50*b* of the pump 1.

The microcomputer unit 140 has a function as a control unit and changes the vibration of the vibration actuator of the pump 1 based on the measured value of the pressure of the air in the tank unit 120. The microcomputer unit 140 obtains the value of the pressure of the air in the tank unit 120, which is the measured value of the pressure in the present embodiment, as the information on the value of the pressure and controls the drive frequency of the electrical current supplied to the coils 50*a*, 50*b* based on this obtained information on the value of the pressure.

The microcomputer unit 140 changes the frequency of the drive signal outputted to the pump 1 to change the pressure of the air in the tank unit 120. The microcomputer unit 140 controls the drive frequency so that the electrical current having the resonance frequency of the vibrating body 30 which can be changed according to the pressure of the air in the tank unit 120 is supplied to the coils 50*a*, 50*b*.

For example, the microcomputer unit 140 refers a look-up table stored in a built-in ROM which is used as the storage part 142 to control so as to store the air in the tank unit 120 so that the pressure of the air in the tank unit 120 becomes predetermined pressure. A table or the like in which the drive frequency is associated with the value of the pressure of the air in the tank unit 120 for switching the drive frequency according to the value of the pressure of the air in the tank unit 120 can be used as the look-up table.

The microcomputer unit 140 switches the drive frequency supplied to the coils 50*a*, 50*b* between a first drive frequency for maximizing the flow rate of the air (see "G2" in FIG. 14) from the pump 1 to the tank unit 120 and a second drive frequency for maximizing the pressure of the air (see "G1" in FIG. 14) in the tank unit 120.

Further, the microcomputer unit 140 switches the drive frequency from the first drive frequency (see "H1" in FIG. 14) to the second drive frequency (see "H2" in FIG. 14) in a phase of increasing the pressure of the air in the tank unit 120. In this regard, a value of the pressure at a timing of switching the drive frequency in the phase of increasing the pressure of the air in the tank unit 120 is referred to as a phase value for the purpose of convenience. With this configuration, it is possible to increase the pressure of the air in the tank unit 120 efficiently and shortly compared with a case where the pump 1 is controlled with the first drive frequency (see "H1" in FIG. 14). The microcomputer unit 140 controls each part according to programs stored in a ROM or the like. With this configuration, it is possible to supply the drive signal of the drive frequency which is changed based on the obtained pressure value information of the air in the tank unit 120 to the coils 50*a*, 50*b* to control the pump 1, for example.

When the pump control system 100 of the present embodiment drives the vibrating body 30 of the resonance-type vibration actuator 10 of the pump 1, the pump control system 100 changes the frequency of the drive signal for driving the vibrating body 30 based on the pressure in the tank unit 120 and supplies the drive signal of the frequency depending on the pressure of the air in the tank unit 120 to the coils 50*a*, 50*b* of the pump 1.

Operation Principal of Pump 1 by Microcomputer Unit 140 (Control Unit)

The pump 1 needs to ensure a required flow rate of the delivered fluid (air) and a required amplitude of the delivered fluid (air pressure).

Generally, in a configuration in which a tank is connected to a resonance-type vibration actuator, it has been known that a phenomenon that a resonance frequency changes according to a change of air pressure in the tank occurs.

Figure 13A:
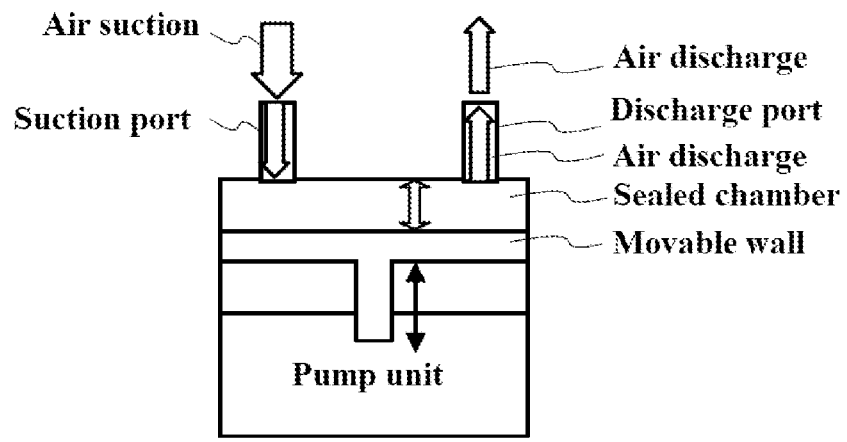
FIG. 13B is a view showing an operating principle of the pump.
Figure 13B:
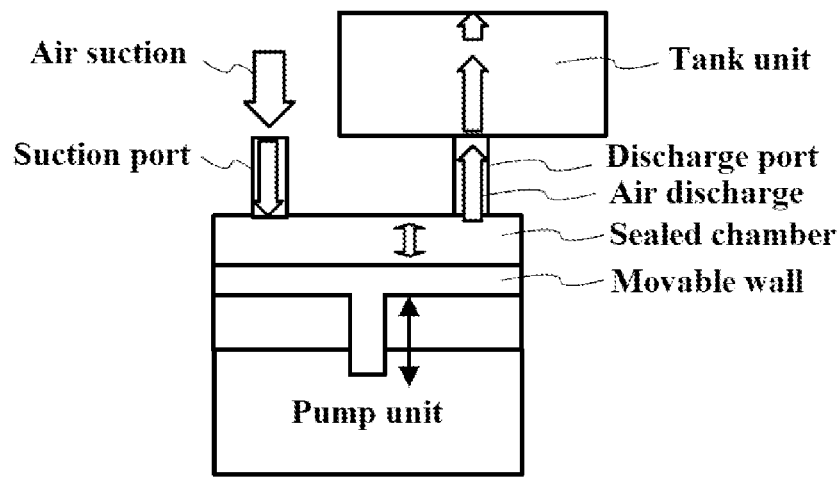

Each of FIG. 13A and FIG. 13B is a view showing an operation principle of the pump 1 of the pump control system 100. FIG. 13A is a schematic view showing a state that a discharge flow path of a pump is opened in the pump 1 like a state that the tank unit is not connected to a discharge port (corresponding to the discharge portion 86). FIG. 13B is a schematic view showing a state that the discharge flow path of the pump is closed by attaching the tank to the discharge port of the pump.

In the state that the discharge flow path of the pump performing the resonant drive is opened (this state is also referred to as "a pump opened state") as shown in FIG. 13A, when the pump vibrates, that is when the movable wall is displaced by the drive of the pump unit, the air discharged from the sealed chamber is discharged to the outside of the pump through the discharge port. In contrast, in the state that the tank unit (corresponding to the tank unit 120) is connected to the pump performing the resonant drive and the discharge flow path to the outside of the pump is closed (this state is also referred to as "a pump closed state") as shown in FIG. 13B, the air in the tank unit influences the vibration of the pump. In this regard, this influence is caused by the configuration in which the sealed chamber and the tank unit are communicated with each other through the discharge port (corresponding to the discharge portion 86) so that the fluid can communicate therebetween.

Namely, when the pressure in the tank unit starts to increase, the air discharged from the pump 1 is directly supplied into the tank unit and thus the air exhibits behavior similar to that in the pump opened state. On the other hand, when the pressure in the tank unit increases, the air supplied from the pump 1 is stored in the tank unit (the flow of the air is indicated by a thick arrow line) because there is no escape portion for the air supplied from the pump 1.

The air in the tank unit communicated with the sealed chamber so that the fluid can communicate therebetween influences the pump 1 (more specifically, the pump units 80 and the vibrating body 30) through the supplied air and serves as an air spring in the pump 1. As described above, in the case that the tank unit is attached to the discharge port of the pump 1, action of the air spring works in the pump closed state unlike the pump opened state. Thus, the resonance frequency f in the pump opened state expressed by the following equation (6) changes to a resonance frequency f' in the pump closed state expressed by the following equation (7). Namely, when the pressure in the tank unit 120 increases due to the drive of the pump 1 in the pump closed state, a spring property also increases and thus the resonance frequency of the actuator of the pump is shifted to the higher side compared with the pump opened state.

Equation 6

$$f = \frac{1}{2\pi}\sqrt{\frac{k}{J}} \quad (6)$$

f: Resonance frequency in pump opened state [Hz]
k: Spring constant of actuator [Nm/rad]
J: Inertial moment [kg*m²]

Equation 7

$$f' = \frac{1}{2\pi}\sqrt{\frac{k + k_{air}}{J}} \quad (7)$$

f': Resonance frequency in pump closed state
$k_{air}$: Spring constant of air

Figure 14:
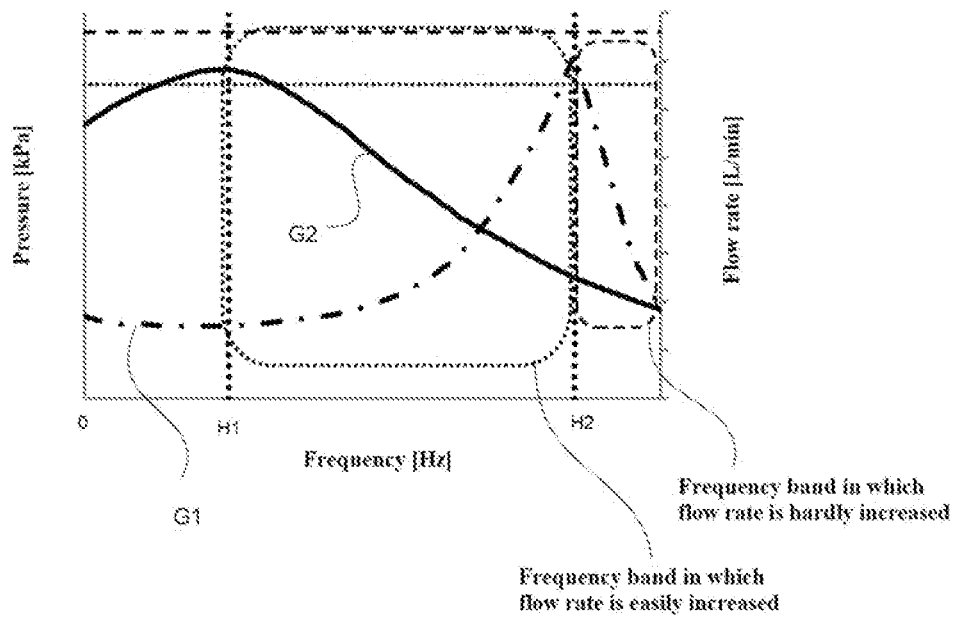
FIG. 14 is a view showing frequency characteristics of pressure of air in a tank in a pump-opened state and a pump-closed state when a resonance type pump of the present embodiment is used.

With considering these matters, the pump control system 100 has frequency characteristics of the pressure of the air in the tank unit and the flow rate of the air from the tank unit shown in FIG. 14. FIG. 14 is a view showing frequency characteristics of the pressure of the air in the tank unit in the pump opened state and the pump closed state when the resonance-type pump of the present embodiment is used. As shown in FIG. 14, a maximum value of pressure G1 of the air in the tank unit in the pump closed state and a maximum value of pressure G2 of the air into the tank unit which represents the flow rate of the air from the pump in the pump opened state into the tank unit (hereinafter, "G2" is referred to as "a flow rate G2" because "G2" represents the flow rate of the air from the pump into the tank unit) of the resonance-type pump at each drive frequency are achieved by drive at different resonance frequency bands (the vicinities of resonance points H1, H2). For example, in a case of a resonance-type pump performing resonant drive at a drive frequency H1 (a first drive frequency H1), the flow rate G2 becomes large (becomes maximum in the drawing) in the pump opened state when the pump is driven at the drive frequency H1 (the first drive frequency H1). However, since the air acts with respect to the vibrating body 30 as the spring in the pump closed state, a resonance point of the vibrating body 30 of the pump is shifted (shifted to the resonance point H2 in FIG. 14) and thus it becomes difficult to increase the pressure G1. On the other hand, with considering the shift of the resonance point, when the pump is drive in the resonance state at a frequency (the second drive frequency H2) in the vicinity of the drive frequency H2 which is a frequency higher than the drive frequency H1, the pressure G1 increases. However, the pump is driven at the resonance frequency at which it is difficult to increase the flow rate G2. As described above, in a device such as the example of sphygmomanometer for which predetermined pressure is required in the tank unit 120, when the pump is driven in the resonance state with a single frequency, the pump needs to be driven at a frequency in which there is disadvantage for either one of the flow rate and the pressure.

In order to use these characteristics, the microcomputer unit 140 (the control unit) in the pump control system 100 of the present embodiment changes the drive frequency when the pressure in the tank unit 120 having a predetermined volume to a predetermined pressure value. Specifically, the microcomputer unit 140 changes the drive frequency by switching the drive frequency between the first drive frequency H1 for maximizing the flow rate G2 of the air from the pump 1 into the tank unit 120 and the second drive frequency H2 for maximizing the pressure G1 of the air in the tank unit 120.

Figure 15:
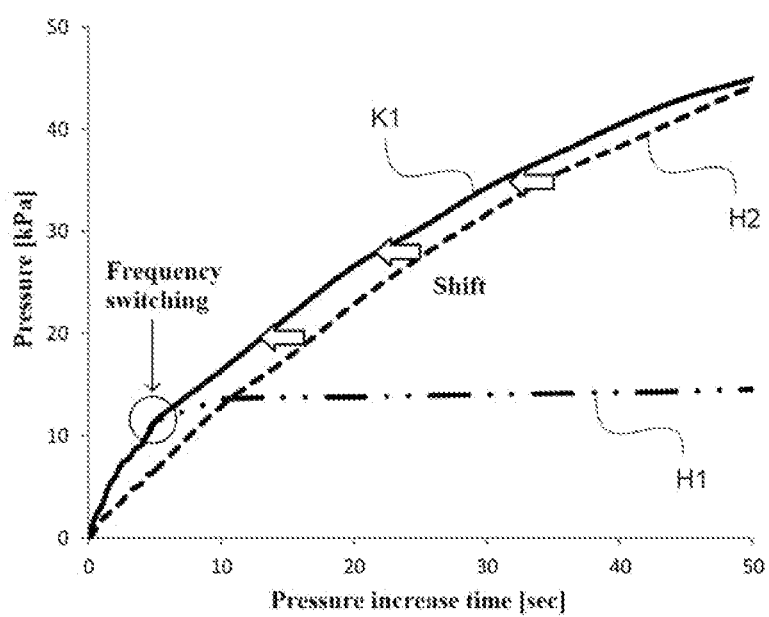
FIG. 15 is a view showing one example of frequency control for the pump control system according to the present embodiment of the present invention.

FIG. 15 is a view showing one example of a frequency control in the pump control system 100 according to the present embodiment of the present invention.

In the pump control system 100, the microcomputer unit 140 controls so as to supply the air (the fluid) into the tank unit 120 to increase the pressure of the air in the tank unit 120 until the pressure of the air in the tank unit 120 reaches the predetermined pressure.

The predetermined pressure (value) is appropriately changed depending on an application target of the pump control device and the pump control system 100 of the present embodiment. In an exemplary case that the pump control system 100 (the pump control device) is applied to the sphygmomanometer, 18 kPa (135 mmHg) or more is defined as high-blood pressure according to high-blood pressure therapy guideline (JSH 2004) and JIS standard (T115) for a noninvasive mechanical sphygmomanometer defines that blood pressure should not exceed 40 kPa. The predetermined pressure (value) is set according to these definitions. The predetermined pressure value may be set to be 40 kPa and may be variable in the range of 18 kPa to 40 kPa. Hereinafter, description will be given to a case that a tank volume is constant (for example, 500 cc) and the pressure in the tank unit 120 is increased to 40 kPa by the pump control system 100 with reference to FIG. 15.

In this case, the microcomputer unit 140 supplies the drive signal of a frequency at which the increase of the pressure from zero is quick, that is the drive signal of a frequency at which an increase degree of the pressure from zero is high, to the coils 50a, 50b. More specifically, the drive signal of lower one frequency (indicated by "H1" as is the case of FIG. 14) of the first drive frequency H1 and the second drive frequency H2, that is the drive signal of the first drive frequency H1 is inputted to the coils 50a, 50b to excite the coils 50a, 50b.

FIG. 15 shows a relationship between the pressure and a pressure increase time due to the drive with the first drive frequency H1 and the drive with the second drive frequency H2 (>H1) (indicated by "H2" as is the case of the frequency indicated by "H2" in FIG. 14). The microcomputer unit 140 switches a process with the first drive frequency H1 to a process with the second drive frequency H2 at a predetermined switching timing. This switching timing is changed based on a pressure state of the air in the tank unit 120. A timing when a gradient indicating the increase of the pressure value of the air in the tank unit 120 becomes gradual is indicated by "frequency switching" in FIG. 15. The drive frequency is changed from the first drive frequency H1 to the second drive frequency H2 at this timing when the gradient becomes gradual. With this configuration, at a rise time (a starting time of the pump 1), the pump 1 is driven by the drive signal of the first drive frequency H1 at which the increase of the pressure of the air in the tank unit 120 is quick. Further, at the timing (the "frequency switching" in FIG. 15) when the gradient indicating the increase of the pressure of the air in the tank unit 120 with the drive signal of the first drive frequency H1 becomes gradual, the drive frequency is changed from the first drive frequency H1 to the second drive frequency H2. A characteristic obtained by shifting the drive frequency from the first drive frequency H1 to the second drive frequency H2 as described above is indicated by "K1" in FIG. 15.

Specifically, different frequencies (for example, the first drive frequency H1 and the second drive frequency H2) are compared with each other and the coils 50a, 50b are excited with the first drive frequency H1 at which the pressure increase time from the rising from zero to the reach to the pressure value at the timing of switching the drive frequency, that is the reach to the phase value (about 10 kPa) is short to allow the vibrating body 30 to vibrate in the resonance state. In the resonant drive with the first drive frequency H1, the pressure increase time of the air in the tank unit 120 is short until the pressure reaches about 10 kPa. However, if the resonant drive is continued with the first drive frequency H1, the pressure in the tank unit 120 does not increase to the predetermined pressure value (for example, 40 kPa).

Further, in a case of performing the resonant drive with the second drive frequency H2 which is higher than the first drive frequency H1, it is possible to make the pressure of the air in the tank unit 120 higher than the predetermined high pressure (for example, 40 kPa), whereas the pressure increase time of the air in the tank unit 120 from zero to the phase value (about 10 kPa) is longer than that of the case of performing the resonant drive with the first drive frequency H1. Thus, in the present embodiment, the resonant drive of the pump 1 is started by the drive signal of the first drive frequency H1 and then the drive frequency of the drive signal is changed to the second drive frequency H2 at the predetermined switching timing (for example, the timing when the pressure reaches 10 kPa). With this configuration, it is possible to drive the pump 1 with the characteristic K1 shown in FIG. 15.

With this configuration, it becomes possible to increase the pressure with a shorter time compared with the resonant drive with the single frequency (the second drive frequency H2). Specifically, it is possible to achieve the predetermined high pressure (for example, 40 kPa) by utilizing a characteristic curve of the characteristic K1 in FIG. 15 with a shorter time compared with a case of utilizing a characteristic curve (indicated by a dotted line in FIG. 15) of the case of performing the resonant drive with only the second drive frequency H2.

Figure 16:
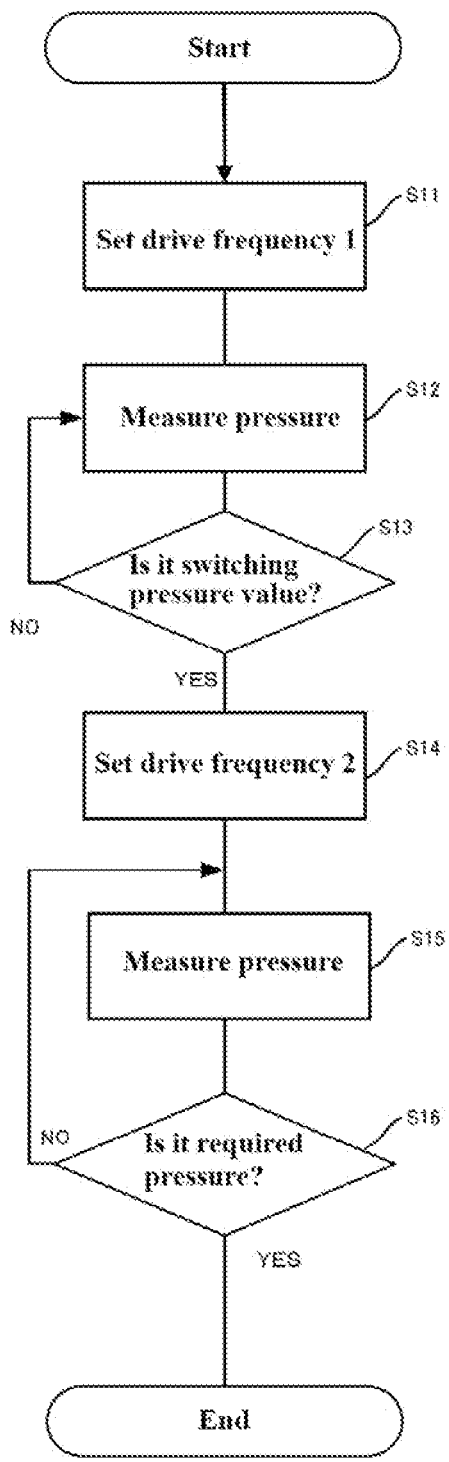
FIG. 16 is a view showing a frequency control flow of the pump control system according to the present embodiment of the present invention.

FIG. 16 is a view showing one example of a control flow of the pump according to the present embodiment of the present invention. As shown in FIG. 16, at first, the drive frequency of the drive signal of the pump control system 100 is set to a drive frequency 1 (the first drive frequency H1) at a step S11. At a step S12, the microcomputer unit 140 uses the pressure measurement unit 130 to measure the pressure in the tank unit 120 and uses the obtaining part 146 to obtain the measured pressure as the pressure value of the air in the tank unit 120. At a step S13, the microcomputer unit 140 determines whether or not the obtained pressure value of the air reaches a switching pressure value (the phase value) and repeats this determination until the obtained pressure value of the air reaches the switching pressure value. Namely, at the step S13, the drive frequency of the electrical current supplied to the coils 50a, 50b is switched between the first drive frequency H1 for maximizing the flow rate G2 of the air (the fluid) from the pump 1 into the tank unit 120 and the second drive frequency H2 for maximizing the pressure G1 of the air (the fluid) in the tank unit 120. If the pressure value reaches the switching pressure value at the step S13, the process is shifted to a step S14. At the step S14, the drive frequency of the electrical current supplied to the coils 50a, 50b is set to a drive frequency 2 (the second drive frequency H2).

Next, the microcomputer unit 140 measures the pressure of the air in the tank unit 120 (a step S15) and then determines whether or not the measured pressure reaches required pressure, that is the predetermined pressure value (a step S16). The microcomputer unit 140 repeats this determination until the measured pressure reaches the predetermined pressure value.

The present embodiment is different from, for example, a frequency response measurement using drive of each single frequency (a series of measurement processes from a process of driving the pump with each set drive frequency to a process of determining whether a current drive frequency is a required drive frequency when pressure caused by this drive is a maximum pressure value). Namely, according to the present embodiment, it is unnecessary to control so as to output maximum pressure at each set drive frequency and it is possible to prevent a control time from increasing unlike the frequency response measurement. According to the present embodiment, it is possible to downsize the pump and ensure more preferable pump pressure and flow rate, thereby stably driving the pump. In particular, in the pump using the resonance-type vibration actuator, it is possible to increase the pressure of the air in the tank unit 120 with a shorter time compared with the drive with the single frequency.

Second Embodiment

Figure 17:
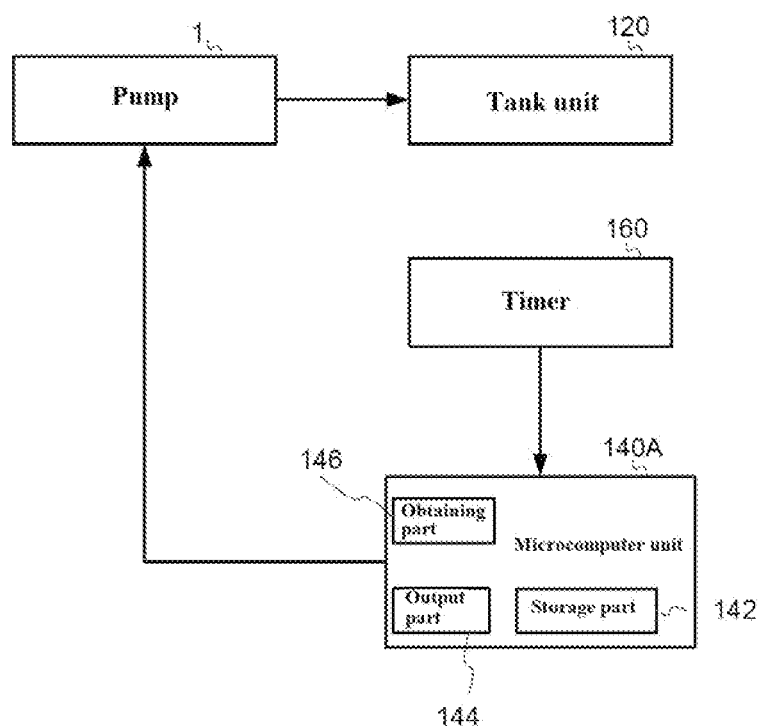
FIG. 17 is a block diagram showing a schematic configuration of a pump control system according to a second embodiment of the present invention.

FIG. 17 is a block diagram showing a schematic configuration of a pump according to a second embodiment of the present invention. A pump control system 100A shown in FIG. 17 uses a timer 160 instead of the pressure detection unit 130 (see FIG. 1) compared with the pump control system 100.

Since a basic configuration of the pump control system 100A according to the second embodiment is the same as the basic configuration of the pump control system 100 of the first embodiment, only different configurations will be described. The same configurations are respectively labelled with the same numbers and the same names and description for the same configurations will be omitted.

The pump control system 100A contains the pump 1, the tank unit 120, a microcomputer unit 140A and a timer 160.

The timer 160 measures a drive time of the vibrating body 30 to obtain the drive time of the vibrating body 30 while the pressure of the air (the fluid) in the tank unit 120 is increased. The obtaining part 146 obtains the drive time of the vibrating body 30. When the obtaining part 146 obtains the drive time of the vibrating body 30 from the timer 160, the pressure value information is obtained from the drive time of the vibrating body 30. This pressure value information in the present embodiment is a table indicating the drive time of the vibrating body 30 set in advance and the pressure of the air in the tank unit 120 which increases according to this drive time and stored in the storage part 142. For example, this table is a timing table indicating a timing of switching the drive frequency of the electrical current supplied to the coils 50a, 50b in the phase of increasing the pressure of the air in the tank unit 120 from the first drive frequency H1 to the second drive frequency H2.

The microcomputer unit 140A uses the table stored in the storage part 142 to operate each part, in particular, control the drive frequency of the electrical current supplied to the coils 50a, 50b based on the table obtained by the obtaining part 146 as the pressure value information. As described above, in the pump control system 100A, the microcomputer unit 140A obtains the pressure increase time in which the pressure of the air in the tank unit 120 increases, that is the drive time of the vibrating body 30 with the timer 160 and obtains the pressure value information indicating a value corresponding to the pressure with the obtaining part 146 without measuring the pressure in the tank unit 120. The microcomputer unit 140A controls the drive frequency of the electrical current supplied to the coils 50a, 50b based on this obtained information.

With this configuration, the microcomputer unit 140A can set a frequency switching time (timing) when the drive frequency of the electrical current supplied to the coils 50a, 50b is controlled and thus can perform the same operation as that of the microcomputer unit 140. Description will be given to one example of the operation of the microcomputer unit 140A with reference to FIG. 15. In FIG. 15, when the drive is performed with the first drive frequency H1, the pressure hardly increases at a phase that is a lapse of about 5 seconds (the position indicated by "the frequency switching" in FIG. 15). A timing table indicating such a frequency switching position may be stored in the storage part 142 as the pressure value information.

The microcomputer unit 140A performs the control of switching the drive frequency of the electrical current supplied to the coils 50a, 50b from the first drive frequency H1 to the second drive frequency H2 after 5 seconds from the start of the pressure increase based on the pressure value information stored in the storage part 142, that is the timing table indicating the frequency switching position. With this configuration, as is the case of using the pressure value detected by the pressure detection unit 130, the microcomputer unit 140A can control the drive frequency of the electrical current supplied to the coils 50a, 50b so as to obtain the characteristic K1 shifted from the first drive frequency H1 to the second drive frequency H2.

Switching Pattern 1

Figure 18:
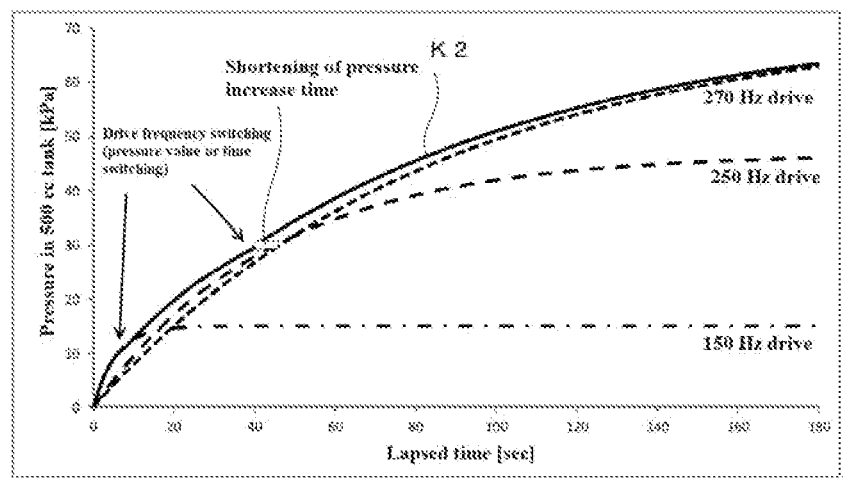
FIG. 18 is a view showing a pattern of a drive frequency control in a case where a tank volume is different.
Figure 19:
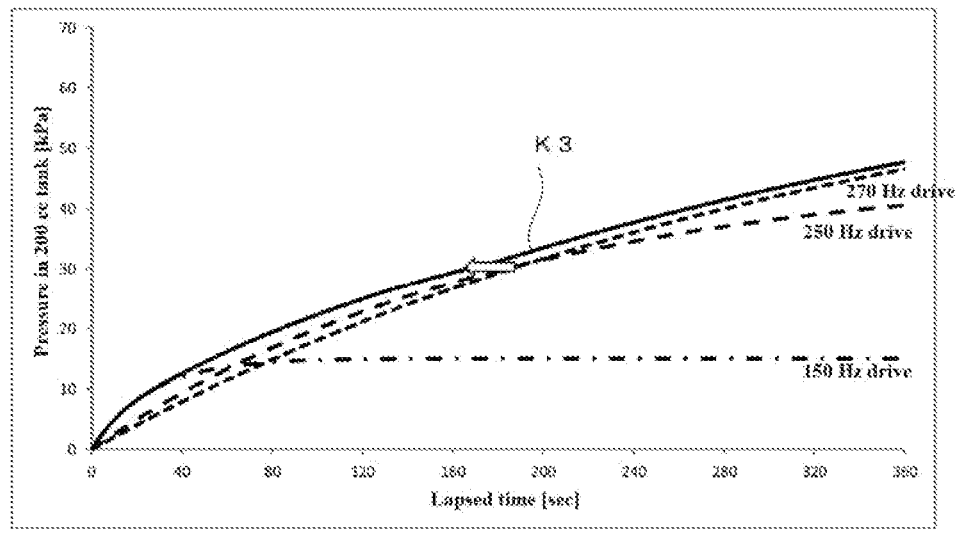
FIG. 19 is a view showing another pattern of the drive frequency control in a case where the tank volume is further different.

FIG. 18 and FIG. 19 are views showing patterns of a drive frequency control of the electrical current supplied to the coils 50a, 50b in cases that the tank volume is changed. FIG. 20 shows a table in the case of switching the drive frequency based on the pressure value with the pump of the first embodiment. FIG. 21A and FIG. 21B show tables in the case of switching the drive frequency based on the time with the pump of the second embodiment. Although initial drive frequencies are 150 Hz, 250 Hz and 270 Hz respectively corresponding to different pressure and flow rates in each figure, these initial frequencies are merely one example. A high and low relationship among the initial drive frequencies is not limited thereto as long as the initial drive frequencies are different from each other.

Characteristics K2, K3 shown in FIG. 18 and FIG. 19 are characteristics at the time of using a frequency in a "frequency band (area) in which the flow rate is easily increased" in the characteristic of the resonance-type actuator whose characteristics in the pump opened state and the pump closed state are different from each other (see FIG. 14).

The pump control system 100 of the first embodiment uses the table shown in FIG. 20 to perform the drive frequency control shown in FIG. 18 and FIG. 19 based on the pressure value in the tank unit 120 measured by the pressure measurement unit 130. In FIG. 18 and FIG. 19, when the drive frequency of the drive signal is controlled by the frequency shift so as to obtain the characteristics K2, K3, the drive frequency of the electrical current supplied to the coils 50a, 50b is changed twice to shorten the increase time of the pressure in the tank unit 120. Both of the twice changes of the drive frequency are performed by switching the drive frequency of the electrical current supplied to the coils 50a, 50b between the drive frequency for maximizing the flow rate G2 of the air and the drive frequency for maximizing the pressure G1 of the air in the phase of increasing the pressure of the air in the tank unit 120.

In FIG. 20, three different frequencies which are examples of the initial drive frequencies are associated with the pressure ("target pressure") of the fluid in the tank unit 120 when each initial frequency is switched to these frequencies. With this configuration, the pump control system 100 can effectively increase the air in the tank unit 120 so as to correspond to the change of the pressure of the fluid in the tank unit 120 regardless of the tank volume more quickly than the case of performing the drive with the single frequency (see arrow lines indicating the shortening of the increase time in FIG. 18 and FIG. 19).

The microcomputer unit 140A of the pump control system 100A of the second embodiment uses the table shown in FIG. 21A to perform the control so as to obtain the characteristic K2 shown in FIG. 18 and uses the table shown in FIG. 21B to perform the control so as to obtain the characteristic K3 shown in FIG. 19. Each of the tables in FIG. 21A and FIG. 21B contains a table in which a plurality of initial drive frequencies differing from each other, times in which the drive is performed by these initial drive frequencies, and the target pressure corresponding to the drive time are associated with each other. The tables are stored in the storage part 142. With this configuration, the pump control system 100A can use the tables depending on the tank volume to effectively increase the air in the tank unit 120 so as to correspond to the change of the pressure of the fluid in the tank unit 120 more quickly than the case of performing the drive with the single frequency.

Switching Pattern 2

Figures 22, 23:
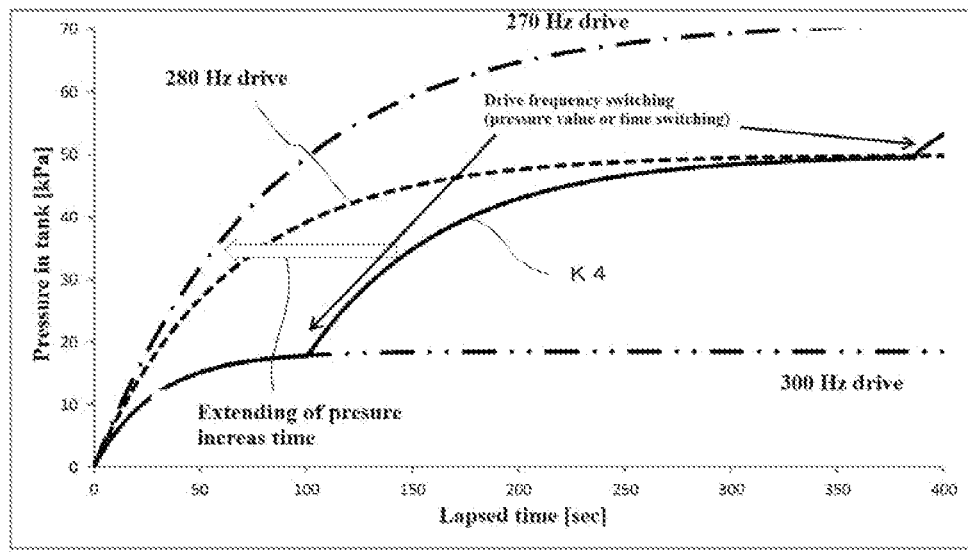
FIG. 22 is a view showing a pattern of the frequency control pattern in the first embodiment and the second embodiment.
FIG. 23 is a view showing a table in a case where the drive frequency is switched according to the pressure value with the pump control system of the first embodiment.
Figures 24, 25:
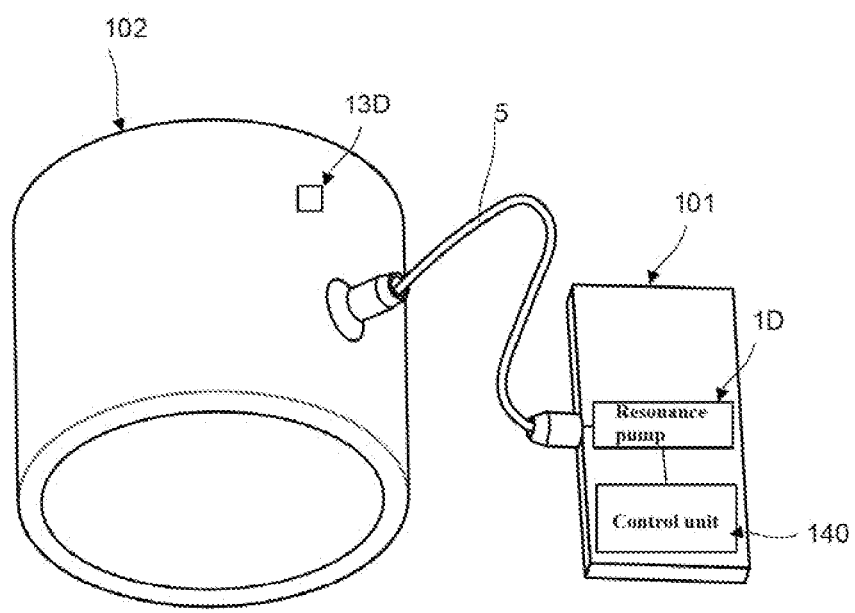
FIG. 24 is a view showing a table in a case where the drive frequency is switched according to the time with the pump control system of the first embodiment.
FIG. 25 is a view schematically showing a pump control system according to a third embodiment of the present invention.

FIG. 22 is a view showing a pattern of gently increasing the air in the tank according to the frequency control of the first embodiment and the second embodiment. FIG. 23 shows a table for a case of controlling so as to obtain a characteristic K4 by switching the drive frequency shown in FIG. 22 based on the pressure value with the pump of the first embodiment. Further, FIG. 24 shows a table for a case of controlling so as to obtain the characteristic K4 by switching the drive frequency shown in FIG. 22 based on the time with the pump of the second embodiment. Although initial drive frequencies are 300 Hz, 280 Hz and 270 Hz in each figure, these initial frequencies are merely one example. A high and low relationship among the initial drive frequencies is not limited thereto as long as the initial drive frequencies are different from each other.

The frequency control shown in FIG. 22 uses a frequency in a "frequency band (area) in which the flow rate is hardly increased" which is a higher frequency area than the second drive frequency H2 in the characteristic of the resonance-type actuator shown in FIG. 14. As described above, the pump control system for controlling the drive frequency of the electrical current supplied to the coils 50a, 50b is used for a case of extending the pressure increase time such as a case that it is desired to gently increase the pressure of the air. For example, the pump may be used in a case that it is required to gently deliver the air at the time of vascular testing of a baby and a toddler, fastening of a belt with respect to a subject being tested.

Third Embodiment

FIG. 25 is a view schematically showing a pump control system according to a third embodiment of the present invention. A pump device shown in FIG. 25 is, for example, a sphygmomanometer 10D. The sphygmomanometer 10D includes a cuff 102 corresponding to the tank unit 120, a tube 5 for supplying air into the cuff 102, a pump drive unit 101, and a pressure measurement unit 13D.

The drive unit 101 includes a resonance pump 1D which is the pump 1 shown in FIG. 1, and a control unit 140 as the microcomputer unit.

The control unit 140 which is the microcomputer unit is connected to the resonance pump 1D and the pressure measurement unit 13D and supplies the drive signal to the resonance pump 1D.

The resonance pump 1D drives according to the drive signal from the microcomputer unit 140. Specifically, the tube 5 is connected to the discharge portion 86 of the resonance pump 1D and the vibrating body 30 vibrates in the resonance pump 1D. Thus, the pump units are driven to suitably supply the air in the cuff of the sphygmomanometer or the like. According to the configuration of the pump control system, it is possible to downsize the pump and ensure the more preferable pump pressure and pump flow rate, thereby stably driving the pump. Further, regarding the cuff, it is possible to increase the pressure in the cuff to the predetermined pressure value in the short time.

The embodiments of the present invention have been explained in the above description. In this regard, the above description is provided to explain the examples of the preferred embodiments and the scope of the present invention is not limited thereto. Namely, the description for the configuration of the above-described device and the shape of each part is merely one example. Thus, it is apparent that various modifications and additions to these examples can be practiced within the scope of the present invention.

INDUSTRIAL APPLICABILITY

The pump according to the present invention can be downsized, makes it possible to ensure the more preferable pump pressure and pump flow rate, and has the effect of enabling the stable drive. For example, the pump of the present invention are useful for a wearable device to which a high output and a thin thickness are desired. For the reasons stated above, the present invention has industrial applicability.

The invention claimed is:

1. A pump control system, comprising:
   a pump; and
   a pump control device for controlling the pump,
   wherein the pump includes:
      a vibration actuator having a fixed body, a shaft portion provided on the fixed body, a vibrating body provided so that the vibrating body can freely perform reciprocating rotation with respect to the fixed body around the shaft portion, a pressing portion provided on the vibrating body so as to protrude in a direction of the reciprocating rotation of the vibrating body, a magnet provided on one of the fixed body and the vibrating body, a coil core portion provided on another one of the fixed body and the vibrating body, and a coil provided on the coil core portion, wherein the vibrating body can perform the reciprocating rotation due to electromagnetic drive caused by electrical current supply to the coil,
      a sealed chamber which includes a movable wall which can be displaced by the pressing portion when the vibrating body performs the reciprocating rotation so that a volume in the sealed chamber can be changed by displacement of the movable wall and fluid can be suctioned into an inside of the sealed chamber or discharged from the inside of the sealed chamber when the volume in the sealed chamber is changed, and
      a discharge portion for communicating the fluid between the sealed chamber and a tank for storing the fluid discharged from the sealed chamber therein to increase pressure of the fluid, and wherein the pump control device comprises:
an obtaining part for obtaining pressure value information indicating a value of the pressure of the fluid in the tank, and
a control unit for controlling a drive frequency of an electrical current to be supplied to the coil based on the obtained pressure value information, wherein the control unit switches the drive frequency from a first drive frequency for maximizing a flow rate of the fluid from the pump into the tank to a second drive frequency for maximizing the pressure of the fluid in the tank when the value of the pressure of the fluid in the tank reaches a switching pressure value, wherein the second drive frequency is higher than the first drive frequency, and wherein the vibrating body of the vibration actuator is supported by a spring mass structure constituted of a magnetic spring provided by the magnet and the coil core portion so that the vibrating body can freely perform the reciprocating rotation.

2. The pump control system as claimed in claim 1, wherein the control unit controls the drive frequency so that the electrical current is supplied to the coil with a resonance frequency of the vibrating body which can be changed according to the pressure of the fluid in the tank.

3. The pump control system as claimed in claim 1, further comprising:
a pressure detection unit for measuring the pressure of the fluid in the tank to obtain the pressure value information indicating the value of the pressure,
wherein the obtaining part obtains the pressure value information from the pressure detection unit.

4. The pump control system as claimed in claim 1, further comprising:
a timer for measuring a time from when the vibrating body starts to vibrate due to the electromagnetic drive caused by the electrical current supply to the coil,
wherein the obtaining part obtains the pressure value information from the time measured by the timer.

5. The pump control system as claimed in claim 4, wherein the pump control device contains a storage part for storing a table indicating a relationship between the time measured by the timer and the pressure of the fluid in the tank,
wherein the pressure of the fluid in the tank increases according to the time measured by the timer, and
wherein the control unit uses the table to control the drive frequency.

6. The pump control system as claimed in claim 1, wherein the movable wall of the sealed chamber has a cylindrical insertion portion provided so as to face the vibrating body, and
wherein the pressing portion is inserted into the insertion portion of the movable wall so that the movable wall is connected to the pressing portion.

* * * * *